United States Patent
Gould et al.

(10) Patent No.: US 10,713,746 B2
(45) Date of Patent: Jul. 14, 2020

(54) FIFO QUEUE, MEMORY RESOURCE, AND TASK MANAGEMENT FOR GRAPHICS PROCESSING

(71) Applicant: Microsoft Technology Licensing, LLC, Redmond, WA (US)

(72) Inventors: Jason M. Gould, Woodinville, WA (US); Ivan Nevraev, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/001,608

(22) Filed: Jun. 6, 2018

(65) Prior Publication Data
US 2019/0236749 A1 Aug. 1, 2019

Related U.S. Application Data

(60) Provisional application No. 62/623,536, filed on Jan. 29, 2018.

(51) Int. Cl.
*G06T 1/20* (2006.01)
*G06F 9/50* (2006.01)
*G06F 9/48* (2006.01)

(52) U.S. Cl.
CPC .............. *G06T 1/20* (2013.01); *G06F 9/4881* (2013.01); *G06F 9/5016* (2013.01)

(58) Field of Classification Search
None
See application file for complete search history.

(56) References Cited

U.S. PATENT DOCUMENTS

| 5,668,767 | A | 9/1997 | Barringer |
| 7,533,237 | B1* | 5/2009 | Nordquist ........... G06F 12/0284 711/100 |
| 8,223,788 | B1* | 7/2012 | Perelstain ............. G06F 3/0659 370/412 |
| 10,120,781 | B2 | 11/2018 | Hu et al. |
| 10,235,220 | B2* | 3/2019 | Howes .................... G06F 9/542 |
| 2004/0107240 | A1 | 6/2004 | Zabarski et al. |

(Continued)

OTHER PUBLICATIONS

Lessley, Brenton, and Hank Childs. "Data-Parallel Hashing Techniques for GPU Architectures." IEEE Transactions on Parallel and Distributed Systems (2019).*

(Continued)

*Primary Examiner* — Ryan M Gray
(74) *Attorney, Agent, or Firm* — Arent Fox LLP

(57) ABSTRACT

Methods and devices for managing first-in first-out (FIFO) queues in graphics processing are described. A write operation can be executed by multiple write threads on a graphics processing unit (GPU) to write data to memory locations in the multiple pages of memory. The write operation can also include allocating additional pages of memory for the FIFO queue where a write allocation pointer is determined to achieve a threshold, such to grow the FIFO queue before the memory is actually needed for writing. Similarly, comprises a read operation can be executed by multiple read threads to read data from the memory locations. The read operation can also include deallocating pages of memory back to a memory pool where a read done pointer is determined to achieve a threshold, such as an end of a page.

26 Claims, 8 Drawing Sheets

(56) References Cited

U.S. PATENT DOCUMENTS

| | | | |
|---|---|---|---|
| 2004/0160449 A1* | 8/2004 | Gossalia | G06F 3/14 345/543 |
| 2009/0091577 A1* | 4/2009 | Brothers | G06T 1/20 345/506 |
| 2010/0125685 A1 | 5/2010 | Ohta | |
| 2010/0318751 A1 | 12/2010 | Andreasen | |
| 2012/0278811 A1* | 11/2012 | Baynast | G06F 9/5027 718/104 |
| 2013/0305009 A1* | 11/2013 | Durant | G06F 9/5016 711/170 |
| 2013/0305252 A1 | 11/2013 | Venkataraman et al. | |
| 2014/0283040 A1 | 9/2014 | Wilkerson et al. | |
| 2014/0331023 A1 | 11/2014 | Sharp et al. | |
| 2014/0365734 A1 | 12/2014 | Bridge et al. | |
| 2015/0123980 A1* | 5/2015 | Nalluri | G06T 1/20 345/522 |
| 2015/0227414 A1 | 8/2015 | Varma | |
| 2015/0269065 A1 | 9/2015 | Bourd et al. | |
| 2016/0062931 A1 | 3/2016 | Darbari | |
| 2016/0062941 A1 | 3/2016 | Darbari | |
| 2016/0139624 A1 | 5/2016 | Orr et al. | |
| 2016/0267005 A1* | 9/2016 | Natarajan | G06F 12/0253 |
| 2017/0039087 A1 | 2/2017 | Darbari | |
| 2017/0126738 A1 | 5/2017 | Wilkerson et al. | |
| 2017/0168755 A1 | 6/2017 | Lo | |
| 2017/0256016 A1* | 9/2017 | Lee | G06F 9/544 |
| 2017/0344503 A1 | 11/2017 | Darbari | |
| 2019/0114172 A1 | 4/2019 | Eyole et al. | |
| 2019/0129633 A1* | 5/2019 | Wang | G06F 12/0238 |
| 2019/0196745 A1* | 6/2019 | Persson | G06F 3/0659 |
| 2020/0004460 A1 | 1/2020 | Gould et al. | |

OTHER PUBLICATIONS

"Non Final Office Action Issued in U.S. Appl. No. 16/024,656", dated Oct. 3, 2019, 14 Pages.

"International Search Report and Written Opinion Issued in PCT Application No. PCT/US2019/037411", dated Sep. 25, 2019, 13 Pages.

* cited by examiner

FIFO QUEUE, MEMORY RESOURCE, AND TASK MANAGEMENT FOR GRAPHICS PROCESSING

CLAIM OF PRIORITY UNDER 35 U.S.C. § 119

The present Application for patent claims priority to Provisional Application No. 62/623,536, entitled "MEMORY RESOURCE MANAGEMENT FOR GRAPHICS PROCESSING" filed Jan. 29, 2018, which is assigned to the assignee hereof and hereby expressly incorporated by reference herein for all purposes.

BACKGROUND

The present examples relate to a computer device, and more particularly, to managing memory for graphics processing on a computer device.

Computer graphics systems, which can render 2D objects or objects from a 3D world (real or imaginary) onto a two-dimensional (2D) display screen, are currently used in a wide variety of applications. For example, 3D computer graphics can be used for real-time interactive applications, such as video games, virtual reality, scientific research, etc., as well as off-line applications, such as the creation of high resolution movies, graphic art, etc. Typically, the graphics system includes a graphics processing unit (GPU). A GPU may be implemented as a co-processor component to a central processing unit (CPU) of the computer, and may be provided in the form of an add-in card (e.g., video card), co-processor, or as functionality that is integrated directly into the motherboard of the computer or into other devices, such as a gaming device.

Typically, the GPU has a "logical graphics pipeline," which may accept as input some representation of a 2D or 3D scene and output a bitmap that defines a 2D image for display. For example, the DirectX collection of application programming interfaces by MICROSOFT CORPORATION, including the DIRECT3D application programming interface (API), is an example of APIs that have graphic pipeline models. Another example includes the Open Graphics Library (OPENGL) API. The graphics pipeline typically includes a number of stages to convert a group of vertices, textures, buffers, and state information into an image frame on the screen. For instance, one of the stages of the graphics pipeline is a shader. A shader is a piece of code running on a specialized processing unit, also referred to as a shader unit or shader processor, usually executing multiple data threads at once, programmed to generate appropriate levels of color and/or special effects to fragments being rendered. In particular, for example, a vertex shader processes traits (position, texture coordinates, color, etc.) of a vertex, and a pixel shader processes traits (texture values, color, z-depth and alpha value) of a pixel. GPUs now also execute compute shaders that can perform highly-parallelized general-purpose computations that may or may not relate to graphics processing.

Memory resources can be allocated for GPUs (e.g., via driver or title executing on a central processing unit (CPU) that manages the memory resources) for performing various graphics processing operations, such as operating shaders or other stages in the graphics pipeline. The driver typically allocates a large amount of memory sufficient for performing the operations. In some cases, however, an amount of memory that is used by a shader or other resource may not be known at the outset of processing, and launching of multiple shaders using the large amount of memory may be prohibitive or wasteful of available system resources.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

One example relates to a method for managing growable first-in first-out (FIFO) queues in graphics processing. The method includes initializing a memory pool of memory resources for multiple FIFO queues, allocating multiple pages of memory from the memory pool to a FIFO queue of the multiple FIFO queues, and executing, via parallel execution of multiple write threads of a graphics processing unit (GPU), a write operation to write data to memory locations in the multiple pages of memory. For a given write thread of the multiple write threads, the write operation can include advancing a write allocation pointer to a next available memory location following one or more memory locations to which the data is to be written, wherein the write allocation pointer is common to the FIFO queue, detecting whether the write allocation pointer achieves a threshold write memory location, and where the write allocation pointer achieves the threshold write memory location, allocating at least one additional page of memory from the memory pool to the FIFO queue.

In other example, a device for managing FIFO queues in graphics processing is provided. The device includes a memory storing one or more parameters or instructions for managing FIFO queues in graphics processing, and at least one processor coupled to the memory. The at least one processor is configured to initialize a memory pool of memory resources in the memory for multiple FIFO queues, allocate multiple pages of the memory pool to a FIFO queue of the multiple FIFO queues, and execute, via parallel execution of multiple write threads of a GPU, a write operation to write data to memory locations in the multiple pages of memory, wherein, for a given write thread of the multiple write threads. The write operation can include advancing a write allocation pointer to a next available memory location following one or more memory locations to which the data is to be written, wherein the write allocation pointer is common to the FIFO queue, detecting whether the write allocation pointer achieves a threshold write memory location, and where the write allocation pointer achieves the threshold write memory location, allocating at least one additional page of memory from the memory pool to the FIFO queue.

In another example, a computer-readable medium, including code executable by a processor managing FIFO queues in graphics processing is provided. The code includes code for initializing a memory pool of memory resources for multiple FIFO queues, allocating multiple pages of memory from the memory pool to a FIFO queue of the multiple FIFO queues, and executing, via parallel execution of multiple write threads of a GPU, a write operation to write data to memory locations in the multiple pages of memory, wherein, for a given write thread of the multiple write threads. The write operation includes advancing a write allocation pointer to a next available memory location following one or more memory locations to which the data is to be written, wherein the write allocation pointer is common to the FIFO queue, detecting whether the write allocation pointer achieves a threshold write memory location, and where the write allocation pointer achieves the threshold write memory location, allocating at least one additional page of memory from the memory pool to the FIFO queue.

In yet another example, a method for managing FIFO queues in graphics processing is provided that includes initializing one or more FIFO queues and monitoring, via one or more processors of the GPU or a central processing unit (CPU), write done pointers associated with each of the one or more FIFO queues. Initializing the one or more FIFO queues can include allocating memory from a memory pool for each of the one or more FIFO queues, associating, with each of the one or more FIFO queues, a function to consume data from the one or more FIFO queues, associating, with each of the one or more FIFO queues, one or more batch sizes of data to be consumed from the one or more FIFO queues, associating a count of threads to be invoked, which should consume each batch of data acquired from the FIFO queue, associating a priority to each of the one or more FIFO queues, setting parameters for each of the one or more FIFO queues to indicate whether the FIFO queue is growable or not, and whether the FIFO queue can be automatically validated or not, and/or adding an amount of initial data to each of the one or more FIFO queues.

In this example, monitoring the write done pointers can include, in response to the determining, based on the write done pointers, that data is present in a FIFO queue but has not been consumed by a read thread, indicating allocation of at least a portion of the data for consumption based on at least one of the one or more batch sizes, the count of threads, the priority, based on determining a first amount of the data written to the FIFO queue as indicated by the write done pointer, and based on determining a second amount of the data that has been allocated for consumption, and invoking execution of one or more threads of a data consumption shader program to be executed in parallel on the GPU, wherein the data consumption shader program is configured to retrieve data from the specified portion of the specified FIFO queue.

Additional advantages and novel features relating to examples of the present invention will be set forth in part in the description that follows, and in part will become more apparent to those skilled in the art upon examination of the following or upon learning by practice thereof.

DETAILED DESCRIPTION

Figure 1:
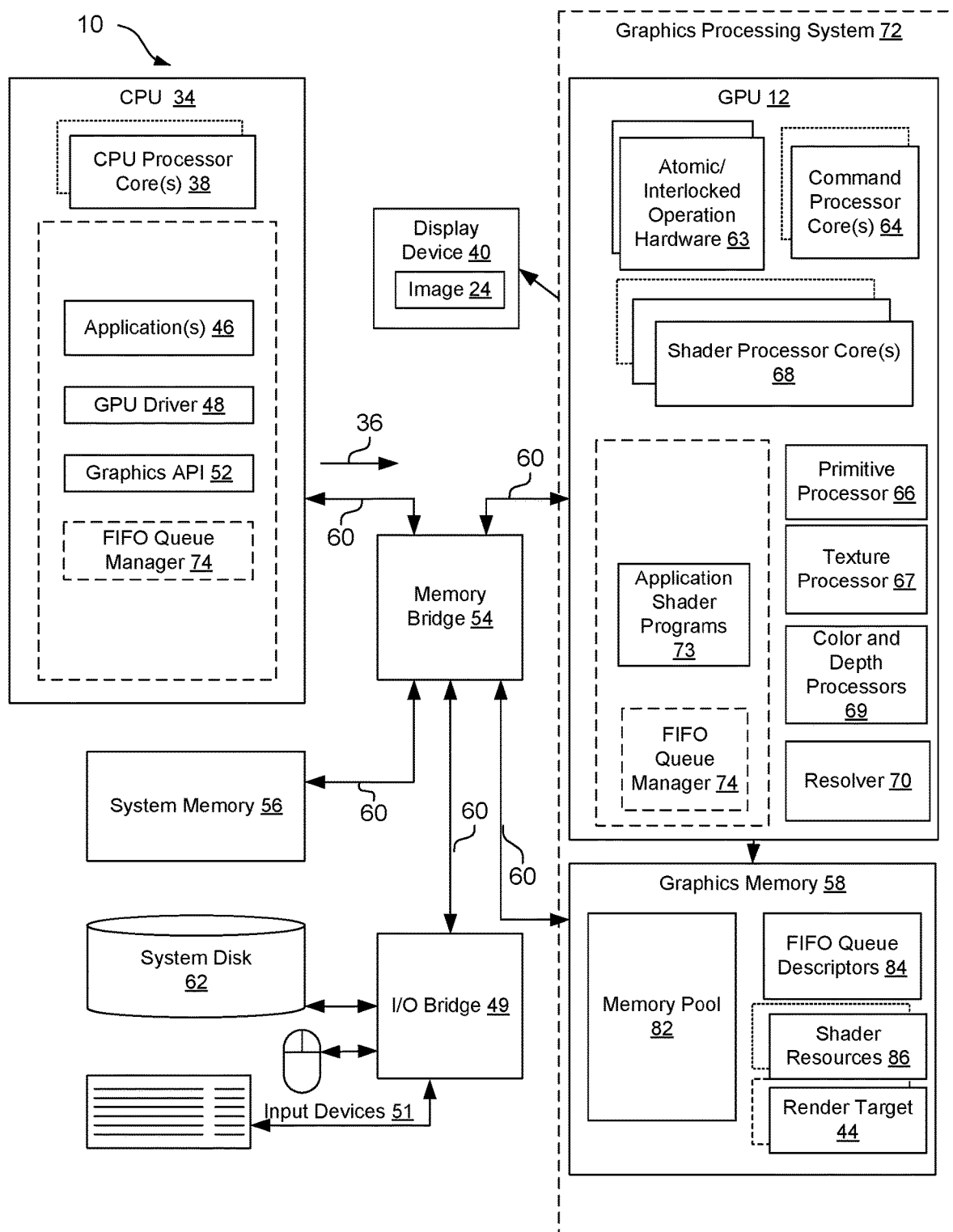
FIG. 1 is a schematic block diagram of an example architecture of a computer device including a graphics processing unit configured according to the described examples.

The described solutions provide a graphical processing unit (GPU) with a flexible, dynamic mechanism that provides managing memory resources, such as first-in first-out (FIFO) queues, for use in graphics processing operations. In one example, the GPU can execute one or more compute shaders to manage the memory resources. For instance, a pool of memory resources can be initialized for use with multiple FIFO queues. An amount of the pool of memory resources, such as one or more pages of memory, can be initially allocated to a given FIFO queue. Multiple threads (e.g., executing in parallel on the GPU) can write data to the FIFO queue. For example, the FIFO queues can be growable or non-growable. For growable FIFO queues, one or more of the threads can allocate additional memory resources from the pool to the FIFO queue at some point to ensure the FIFO queue has sufficient memory resources for writing. For example, the FIFO queue can include a write allocation pointer that can be advanced by a given thread beyond the memory location to which the thread is to write the data, so the next write thread can write at the memory location of the write allocation pointer (and can advance the write allocation pointer for the next write thread). Once a thread detects the write allocation pointer as achieving a threshold memory location, such as the end of a page that is not the last page, the thread detecting the condition can allocate an additional page (or pages) of memory for the FIFO queue.

Similarly, multiple threads (e.g., executing in parallel on the GPU) can read data from the FIFO queue, and/or can deallocate the read memory resources back to the pool. For example, the FIFO queue may include a read allocation pointer that can be advanced by a given thread beyond a memory location from which the data is read, so the next read thread can begin reading at the read allocation pointer (and can advance the read allocation pointer for the next read thread). The FIFO queue may also include a read done pointer that is advanced once the memory is actually read. Once a thread detects the read done pointer as achieving a threshold memory location, such as the end of a page or beginning of a next page, for example, the thread detecting the condition can deallocate the page. In addition, for example, the FIFO queue may also have an associated write done pointer to indicate that all memory locations before the write done pointer have, indeed, been written to by the multiple threads writing data to the FIFO queue. In an example, this write done pointer can be used to determine when to execute the read threads to read the data from the FIFO queue.

In another example, a dispatcher thread, which may execute on a different processor such as a central processing unit (CPU) or a different portion of the GPU, may manage writing to and/or reading from the threads (and/or more complicated thread operations, as described herein). For example, the dispatcher thread may check the write done pointers for each FIFO to determine whether to dispatch read threads to read the FIFO data. In one example, this may be based on determining whether the write done pointer achieves a threshold (e.g., a threshold amount of data written that has not been read, which may be based on also evaluating the read allocation pointer, or a separate read pointer or counter maintained by the dispatcher thread). In an example, the threshold may be based on a priority of the FIFO. In addition, in some examples, the dispatcher thread may be responsible for moving the read allocation pointer and/or write allocation pointer in one operation, rather than each thread incrementing the pointer.

In any case, efficiencies in allocating and using memory for graphics operations are improved by the mechanisms described herein. For example, providing the growable FIFO queues can allow shaders to operate using an amount of memory just above what may be required for the shader at a given period of time. In addition, freeing the memory resources allows for conservative memory use for simultaneously operating other shaders or performing other graphics processing operations. Moreover, having the dispatcher thread monitor FIFO status and launch work, as in some examples described herein, can allow for work to be completed in small batches, thus keeping the amount of outstanding data in the pool relatively small. Additionally, this may improve cache behavior by the GPU, as data that is consumed is more likely to have been produced reasonably recently Referring to FIG. 1, in one example, a computer device 10 includes a graphics processing unit (GPU) 12 configured to implement the described features of managing memory resources for performing graphics operations. For example, GPU 12 is configured to allocate memory from a pool to multiple FIFO queues, write data, in parallel, to the FIFO queues, allocate additional memory from the pool during the write operation, read data, in parallel, from the FIFO queues, deallocate memory back to the pool once read, etc., as described further herein. In addition, the CPU 34 and/or GPU 12 can execute one or more compute shaders to provide managing of the growable or non-growable (e.g., ring buffer) memory resources. As described herein, this may also be coupled driver and/or other software functionality at the CPU 34 (e.g., a dispatcher thread) that can work in conjunction with the one or more compute shaders, as described herein. In this regard, GPU 12 and/or CPU 34 can include a FIFO queue manager 74 to facilitate initializing and managing FIFO queues, as described herein, etc. Moreover, an interface may be exposed, via software executing on the CPU 34 or GPU 12, to allow for leveraging the functions for using and managing memory resources.

For example, in one implementation, computer device 10 includes a CPU 34, which may be one or more processors, or CPU processor core(s) 38, that are specially-configured or programmed to control operation of computer device 10 according to the described examples. For instance, a user may provide an input to computer device 10 to cause CPU 34 to execute one or more of software application(s) 46, GPU driver 48, graphics application programming interface (API) 52, an optional CPU-side FIFO queue manager 74, as described in further detail herein, etc. Software application(s) 46 that execute on CPU 34 may include, for example, but are not limited to one or more of an operating system, a word processor application, an email application, a spread sheet application, a media player application, a video game application, a graphical user interface application or another program. Additionally, the GPU driver 48 can be executed for controlling the operation of GPU 12. The user may provide input to computer device 10 via one or more input devices 51 such as a keyboard, a mouse, a microphone, a touch pad or another input device that is coupled to computer device 10 via an input/output bridge 49, such as but not limited to a southbridge chipset or integrated circuit.

The software applications 46 that execute on CPU 34 may include one or more instructions that executable to cause CPU 34 to issue one or more graphics commands 36 to cause the rendering of graphics data associated with an image 24 on display device 40. The image 24 may comprise, for example, one or more objects, and each object may comprise one or more primitives, as explained in more detail below. For instance, in some implementations, the software application 46 places graphics commands 36 in a buffer in the system memory 56 and the command processor 64 of the GPU 12 fetches them. In some examples, the software instructions may conform to a graphics API 52, such as, but not limited to, a DirectX and/or Direct3D API, an Open Graphics Library (OpenGL®) API, an Open Graphics Library Embedded Systems (OpenGL ES) API, an X3D API, a RenderMan API, a WebGL API, a Vulkan API, a Metal API, a CUDA API or any other public or proprietary standard graphics API that may provide functionality to implement certain shaders, such as compute shaders, which allow for performing highly-parallelized general-purpose computations that may or may not relate to graphics processing. In order to process the graphics rendering instructions, CPU 34 may issue one or more graphics commands 36 to GPU 12 (e.g., through GPU driver 48) to cause GPU 12 to perform some or all of the rendering of the graphics data. In some examples, the graphics data to be rendered may include a list of graphics primitives, e.g., points, lines, triangles, quadrilaterals, triangle strips, etc.

In another example, the software applications 46 that execute on CPU 34 may include one or more ray tracing applications that can generate an image 24 from the perspective of a virtual camera shooting rays from a viewing points. For a given pixel in the image 24, for example, the path of a ray that passes through the pixel from the viewing point can be traced until it intersects with an object in the environment. The surface of the object can have a color associated with it at the intersection point, as well as values that indicate albedo (reflectivity), scattering, refraction, diffusion or another material property. Such values can be interpolated in ray tracing, for example, between values of properties of vertices of the object. At the intersection point, depending on the surface of the object, the ray can be reflected or refracted within the environment, or it can generate diffuse rays, to simulate optical effects such as reflection, refraction/translucence, scattering, and dispersion. The angle of the surface at the intersection point can be determined by interpolating between norms of vertices of the object, or the angle of the surface at the intersection point can be estimated as the angle of a face plane of the object. A shadow ray can be generated, in the direction of a light source, to simulate optical effects such as shading from the light source (blocking of light from the light source). Such newly generated rays (secondary rays) can be similarly traced in the environment, and can generate other rays (tertiary rays), and so on. Successive rays can be generated, for example, until a threshold number of stages is reached or threshold distance is traveled. Ultimately, the value of the given pixel in ray tracing can depend on the color of the surface of the object at the intersection point and results reported back from secondary rays, which may in turn depend on results reported back from tertiary rays, and so on, so as to simulate shadows, reflected light, refracted light, and other effects at the intersection point. Thus, in addition to the color of the surface at the intersected point, the value of the given pixel can depend on the incoming light and material properties of the object at the intersection point.

Ray tracing, in this regard, can produce ray or pixel information, and can group the information by one or more detected properties, such as a determined texture or surface of the ray/pixel for processing. In this example, a size of memory to hold the information for each texture or surface is not known prior to the ray tracing. Thus, ray tracing can benefit by using the growable or non-growable rung-buffer style memory resources, as described herein, and/or a ring buffer, to store, read, and/or otherwise process the information.

Computer device 10 may also include a memory bridge 54 in communication with CPU 34 that facilitates the transfer of data going into and out of system memory 56 and/or graphics memory 58. For example, memory bridge 54 may receive memory read and write commands, and service such commands with respect to system memory 56 and/or graphics memory 58 in order to provide memory services for the components in computer device 10. Memory bridge 54 is communicatively coupled to GPU 12, CPU 34, system memory 56, graphics memory 58, and input/output bridge 49 via one or more buses 60. In an example, for example, memory bridge 54 may be a northbridge integrated circuit or chipset.

System memory 56 may store program modules and/or instructions that are accessible for execution by CPU 34 and/or data for use by the programs executing on CPU 34. For example, system memory 56 may store the operating system application for booting computer device 10. Further, for example, system memory 56 may store a window manager application that is used by CPU 34 to present a graphical user interface (GUI) on display device 40. In addition, system memory 56 may store software applications 46 and other information for use by and/or generated by other components of computer device 10. For example, system memory 56 may act as a device memory for GPU 12 (although, as illustrated, GPU 12 may generally have a direct connection to its own graphics memory 58) and may store data to be operated on by GPU 12 as well as data resulting from operations performed by GPU 12. For example, system memory 56 may store any combination of texture buffers, depth buffers, stencil buffers, vertex buffers, frame buffers, or the like. System memory 56 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

Additionally, in an example, computer device 10 may include or may be communicatively connected with a system disk 62, such as a CD-ROM or other removable memory device. System disk 62 may include programs and/or instructions that computer device 10 can use, for example, to boot operating system in the event that booting operating system from system memory 56 fails. System disk 62 may be communicatively coupled to the other components of computer device 10 via input/output bridge 49.

As discussed above, GPU 12 may be configured to perform graphics operations to render one or more render targets 44 (e.g., based on graphics primitives, ray tracing, etc.) to display device 40 to form image 24. For instance, when one of the software applications 46 executing on CPU 34 requires graphics processing, CPU 34 may provide graphics commands and graphics data associated with image 24, along with graphics command 36, to GPU 12 for rendering to display device 40. The graphics data may include, e.g., drawing commands, state information, primitive information, texture information, ray tracing information, etc. GPU 12 may include atomic/interlocked operation hardware 63 for providing atomic/interlocked (e.g., semaphore) operations, such as for incrementing or otherwise modifying one or more values stored in Graphics Memory 58, System Memory 56, and/or other locations. GPU 12 may also include one or more processors, including a command processor 64 for receiving graphics command 36 and initiating or controlling the subsequent graphics processing by at least one primitive processor 66 for assembling primitives, a plurality of graphics shader processor cores 68 for processing vertex, surface, pixel, and other data for GPU 12, one or more texture processors 67 for generating texture data for fragments or pixels, and one or more color and depth processors 69 for generating color data and depth data and merging the shading output. The shader processor core(s) 68 can execute one or more application shader program(s) 73 to process the vertex, surface, pixel, and/or other data for the GPU 12 or to perform other graphics-related (or non-graphics-related) processes. In an example, primitive processor 66 may implement input assembler and rasterizer stages of a logical graphics pipeline, as is discussed below. GPU 12 may, in some instances, be built with a highly parallel structure that provide more efficient processing of complex graphic-related operations than CPU 34. For example, GPU 12 may include a plurality of processing elements that are configured to operate on multiple vertices or pixels in a parallel manner. The highly parallel nature of GPU 12 may, in some instances, allow GPU 12 to draw graphics image 24, e.g., GUIs and two-dimensional (2D) and/or three-dimensional (3D) graphics scenes, onto display device 40 more quickly than drawing the image 24 directly to display device 40 using CPU 34. Additionally, GPU 12 may be configured to perform highly-parallelized general-purpose operations for graphics or non-graphics purposes, such as executing a compute shader, as described.

GPU 12 may, in some instances, be integrated into a motherboard of computer device 10. In other instances, GPU 12 may be present on a graphics card that is installed in a port in the motherboard of computer device 10 or may be otherwise incorporated within a peripheral device configured to interoperate with computer device 10. GPU 12 may include one or more processors, such as one or more microprocessors, application specific integrated circuits (ASICs), field programmable gate arrays (FPGAs), digital signal processors (DSPs), or other equivalent integrated or discrete logic circuitry.

In an example, GPU 12 may be directly coupled to graphics memory 58. For example, graphics memory 58 may store any combination of index buffers, vertex buffers, texture buffers, depth buffers, stencil buffers, render target buffers, frame buffers, state information, shader resources, constants buffers, coarse shading rate parameter (SRP) maps (e.g., a 2D map of a viewable area at coarse resolution that can be used to look-up an SRP value based on a closest point in the map to the transformed vertex), unordered access view resources, graphics pipeline stream outputs, or the like. As such, GPU 12 may read data from and write data to graphics memory 58 without using bus 60. In other words, GPU 12 may process data locally using storage local to the graphics card, instead of system memory 56. This allows GPU 12 to operate in a more efficient manner by eliminating the need of GPU 12 to read and write data via bus 60, which may experience heavy bus traffic. In some instances, however, GPU 12 may not include a separate memory, but instead may utilize system memory 56 via bus 60. Graphics memory 58 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media. Moreover, in an example, one or more compute shaders can be launched to manage growable memory resources in graphics memory 58, as described herein. Graphics memory 58 may also include a memory pool 82 allocated by the FIFO queue manager 74 to provide memory to growable (or non-growable) FIFO queues for application shader program(s) 73 and/or shader processor core(s) 68. Graphics memory 58 may also include FIFO queue descriptors 84 defining one or more FIFO queues in the memory pool 82, which may include page addresses 212 from the memory pool 82, per-page write done counters 224, per-page read done counters 226, various pointers 214, etc., as described further herein. Graphics memory 58 may also include shader resources 86 to otherwise facilitate operation of the various application shader programs 73 and/or shader processor cores 68.

CPU 34 and/or GPU 12 may store rendered image data, e.g., render targets 44, in a render target buffer of graphic memory 58. It should be noted that the render target buffer also may be an independent memory or may be allocated within system memory 56. GPU 12 may further include a resolver component 70 configured to retrieve the data from a render target buffer of graphic memory 58 and convert multisample data into per-pixel color values to be sent to display device 40 to display image 24 represented by the rendered image data. In some examples, GPU 12 may include a digital-to-analog converter (DAC) that is configured to convert the digital values retrieved from the resolved render target buffer into an analog signal consumable by display device 40. In other examples, GPU 12 may pass the digital values to display device 40 over a digital interface, such as a High-Definition Multi-media Interface (HDMI interface) or a DISPLAYPORT interface, for additional processing and conversion to analog. As such, in some examples, the combination of GPU 12, graphics memory 58, and resolver component 70 may be referred to as a graphics processing system 72.

Display device 40 may include a monitor, a television, a projection device, a liquid crystal display (LCD), a plasma display panel, a light emitting diode (LED) array, such as an organic LED (OLED) display, a cathode ray tube (CRT) display, electronic paper, a surface-conduction electron-emitted display (SED), a laser television display, a nanocrystal display or another type of display unit. Display device 40 may be integrated within computer device 10. For instance, display device 40 may be a screen of a mobile telephone. Alternatively, display device 40 may be a stand-alone device coupled to computer device 10 via a wired or wireless communications link. For instance, display device 40 may be a computer monitor or flat panel display connected to a personal computer via a cable or wireless link. Additionally, in some configurations such as in a datacenter environment, Display device 40 may not be present at all, or may be connected remotely via a network connection and possibly another computer device.

According to one example of the described features, graphics API 52 and GPU driver 48 may configure GPU 12 to execute a logical graphics pipeline to perform various operations described herein.

Figure 2:
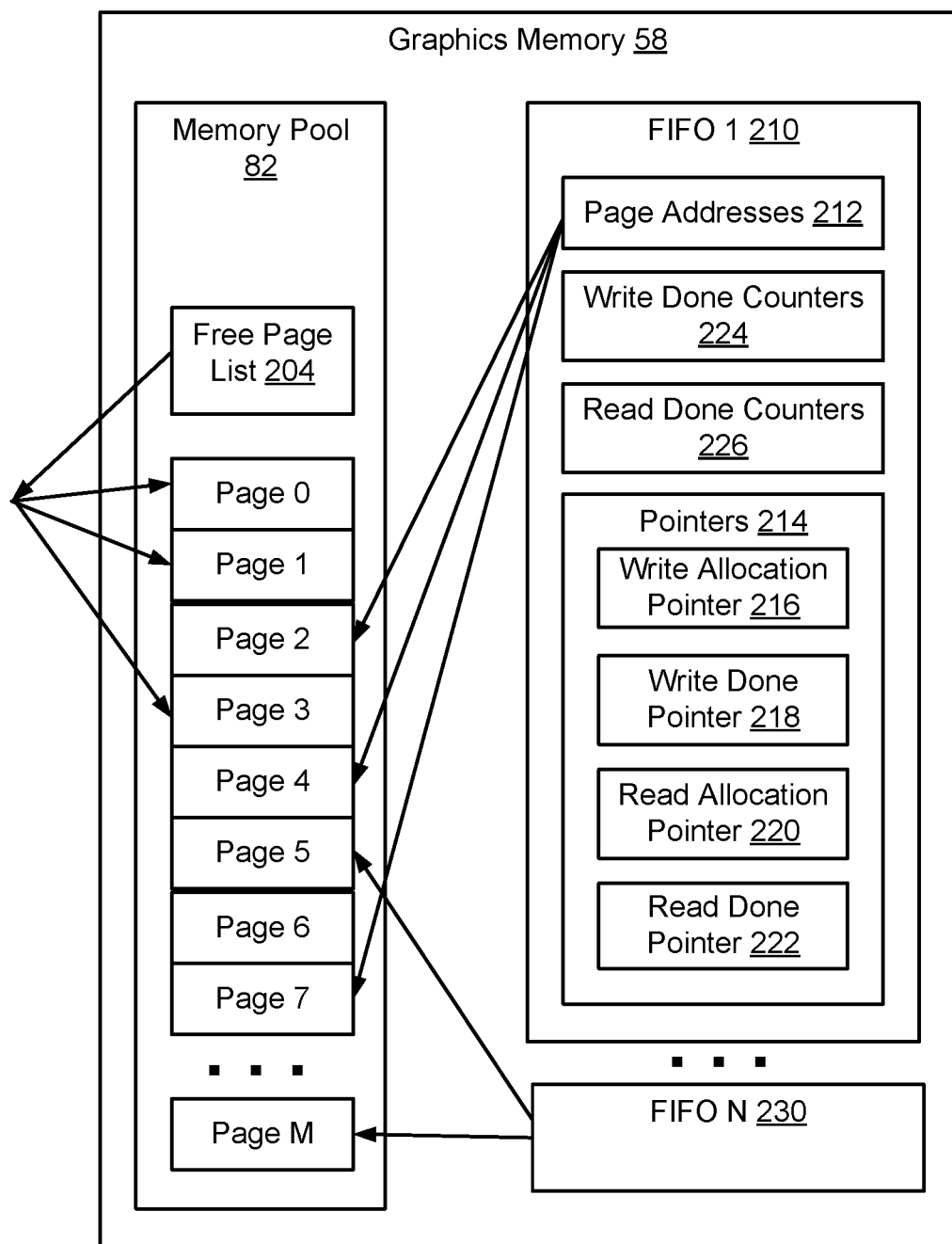
FIG. 2 is a schematic diagram of an example of a state of graphics memory of the computer device of FIG. 1.

FIG. 2 illustrates an example of a state of graphics memory 58, which can be initialized and/or managed by a FIFO queue manager 74 within the GPU 12 and/or CPU 34, in accordance with aspects described herein. Graphics memory 58, as initialized for the GPU 12 by CPU 34 and/or one or more applications, drivers, etc. executing thereon, may include a memory pool 82 of virtual memory addresses initialized for managing multiple FIFO queues, where the memory pool 82 may include virtual memory addresses that are at least partially allocated to physical memory in the graphics memory 58. For example, the memory pool 82 may include a list of memory pages, or pointers to the memory pages, e.g., page 0, page 1, page 2, page 3, page 4, page 5, page 6, page 7, . . . , page M, that may be allocated in the memory pool 82. The memory pool 82 may include a free page list 204 of pages that can be allocated out of the memory pool 82, which in the depicted example include page 0, page 1, and page 3.

Graphics memory 58 can also include multiple FIFO queues, including FIFO 1 210, . . . , FIFO N 230. Each FIFO queue can have an associated list of page addresses 212, which can correspond to pages from the memory pool that are allocated to the FIFO queue (and thus removed from the free page list 204). For example, for FIFO 1 210, the list of page addresses can include page 2, page 4, and page 7, to which data can be written and/or read, as described herein. In addition, each FIFO queue may include multiple pointers 214, such as a write allocation pointer 216 to indicate a memory location for a next write operation, a write done pointer 218 to indicate a memory location where all writes preceding the write done pointer 218 have been completed, a read allocation pointer 220 to indicate a memory location for a next read operation, and/or a read done pointer 222 to indicate a memory location where all reads preceding the read done pointer 222 have been completed. The pointers 214 can be used for various purposes, such as to determine when to allocate and/or deallocate memory to/from a given FIFO queue, when to perform a read operations of data written by write operations that have occurred, and/or the like, as described further herein.

In an example, the pointers 216, 218, 220, 222 may be 32-bit integers or other values, and may be constructed to indicate multiple identifiers. For example, the pointers 216, 218, 220, 222 may be constructed to have a number of low order bits to indicate a memory location within a page (e.g., a number of bits equal to a page size divided by a memory unit size for the FIFO). For example, for pages that are 64 kB and where the FIFO uses a 16-byte memory unit size, the low order bits can include enough bits to indicate 4096 (2^12) memory locations (e.g., 12 bits). In addition, the pointers 216, 218, 220, 222 may be constructed to have a number of high order bits that can indicate an identifier of the memory page, which may be an index into an array of memory page addresses 212 allocated for the FIFO queue. In an example, the pointers 216, 218, 220, 222 may also have one or more wrapping bits to indicate when the lower-order bits (page index and offset within the page) have exceeded capacity. This may be useful, for example, where the memory size unit used by the FIFO is not a power of 2 because the number of data items that fit into a memory page also is not a power of 2. Thus, the number of data items in a page multiplied by the number of pages is also likely not a power of 2.

In addition, for example, each FIFO may include a per-page write done counter 224 that can track (e.g., be incremented) when a write operation is performed, to track a number of data items written to the page. In one example, there may be a write done counter 224 per page (e.g., or one for the current pages being written). In another example, as in non-growable FIFOs which may not use pages, the FIFO's data may be subdivided into segments, with one write done counter 224 per segment. In another example, a growable FIFO may be subdivided into segments which are smaller than, equal to, or larger than a page size, with one write done counter 224 per segment. In addition, for example, each FIFO may include a list of read done counters 226, where one read done counter can track (e.g., be incremented) when a read operation is performed to track a number of data items read from a corresponding portion of the FIFO. In one example, there may be a read done counter 226 per page (e.g., or one for the current pages being read), or for a segment of the FIFO that is smaller or larger than a page. The write done counters 224 and read done counters 226 can be initialized with their respective FIFOs and can track writes/reads for a given page (and/or multiple counters can be provided for multiple pages, in one example). When all data is written to, or read from a page or segment of a FIFO (as can be determined by Write Done Pointer 218 or Read Done Pointer 222), the associated counters 224 or 226 can be reset to 0.

Figure 3:
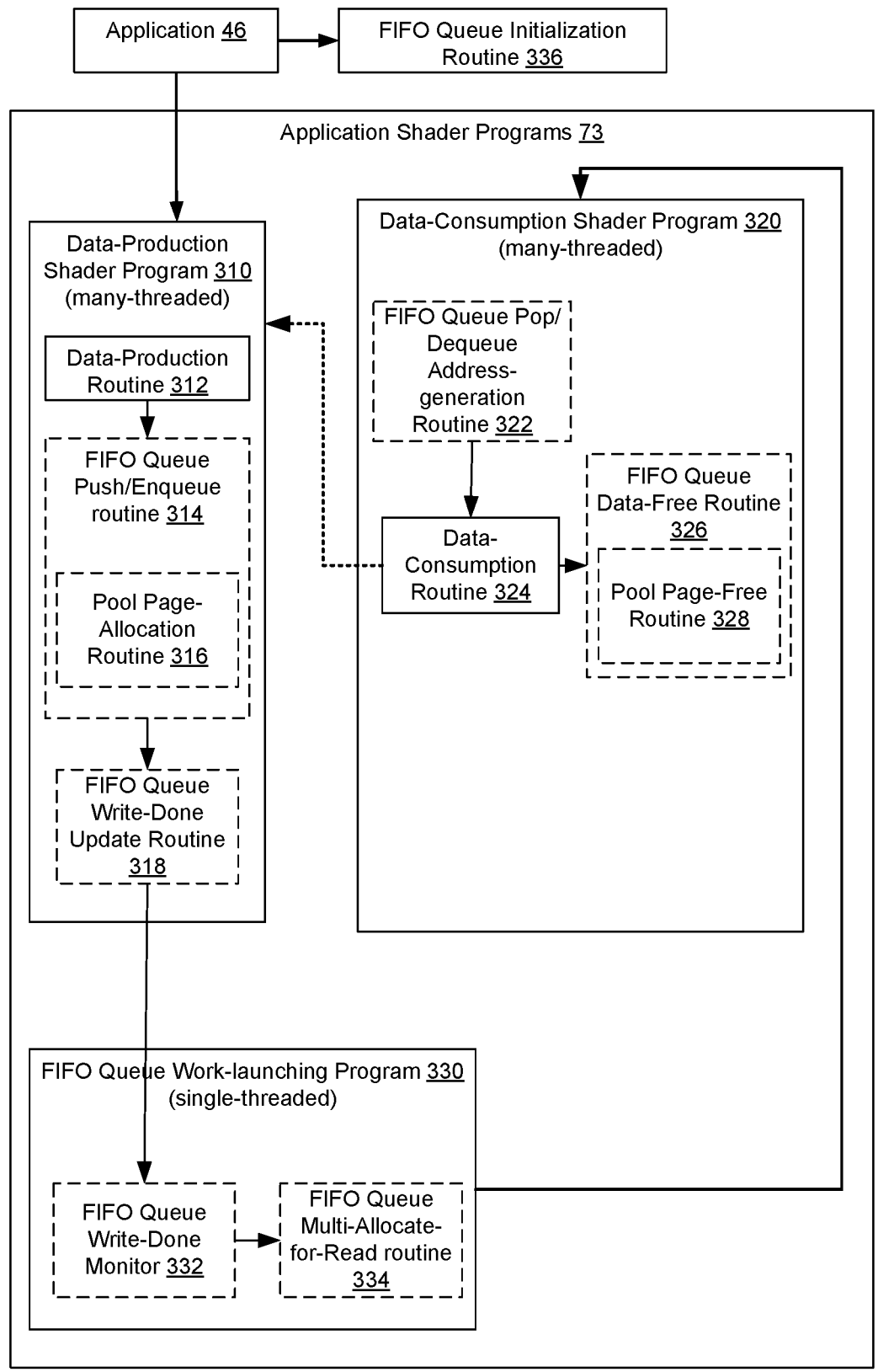
FIG. 3 is a schematic diagram of an example of applications executing on the computer device or one or more processors of FIG. 1.

FIG. 3 illustrates an example of application routines that can be executed by CPU 34, and shader programs 73 that can be implemented and/or executed by shader processor core(s) 68 and/or CPU 34 for writing and reading data to/from one or more FIFO queues (e.g., FIFO 1 210 . . . FIFO N 230). For example, application shader programs 73 may include a data-production shader program 310 for writing data to the FIFO queues. For example, data-production shader program 310 can be concurrently executed by multiple threads to write data to a given FIFO queue. In an example, data-production shader program 310 may receive data for writing to the FIFO queue based on data received from an application 46 (e.g., as rendering instructions, ray-tracing commands, related parameters, etc.). Data-production shader program 310 can include one or more data-production routine 312 for producing data to be written to the FIFO queue (e.g., data related to performing one or more graphics-related tasks, such as rendering instructions, instructions for defining corresponding primitives, vectors, shading rates, etc., ray-tracing instructions, or non-graphics-related processes), as received from the application 46 or otherwise interpreted from instructions received from the application 46, and a FIFO queue push/enqueue routine 314 for writing data to the FIFO queue. For example, FIFO queue push/enqueue routine 314 can write data to the FIFO queue 210 and update a write allocation pointer 216, as described further herein (e.g., in action 406 of method 400 of FIG. 4, method 500 of FIG. 5, etc.). FIFO queue push/enqueue routine 314 may also include a pool page-allocation routine 316 for allocating one or more additional pages of memory to the FIFO queue if needed (e.g., as described in action 408 of method 400, and action 504 of method 500), and/or a FIFO queue write-done update routine 318 to update a write done pointer 218 of the FIFO queue (e.g., as described in action 508 of method 500).

Application shader programs 73 may also include a data-consumption shader program 320 for reading data from the FIFO queues. For example, data-consumption shader program 320 can be concurrently executed by multiple threads to read data from one or more given FIFO queues. Data-consumption shader program 310 can include a FIFO queue pop/dequeue address generation routine 322 for determining a memory location at which to read data from the FIFO queue. For example, FIFO queue pop/dequeue address generation routine 322 can determine the address/memory location based on a value of the read allocation pointer 220 as read and incremented by FIFO Queue Work-launching Program 330, or as read and incremented by data-consumption shader program 320, as described further herein (e.g., in action 412 of method 400 in FIG. 4, action 602 of method 600 in FIG. 6, etc.). Data-consumption shader program 320 may also include a data-consumption routine 324 for reading the data at the memory location, and/or a FIFO queue data-free routine 326 for freeing the memory location. For example, FIFO queue data-free routine 326 can free the memory location at least in part by moving a read done pointer 222 to or beyond the memory location, as described further herein (e.g., in action 606 of method 600). FIFO queue data-free routine 326 may include a pool page-free routine 328 for freeing a page of memory back to the memory pool 84, as described further herein (e.g., in action 414 of method 400, action 608 of method 600, etc.).

In addition, application shader programs 73 can include a FIFO queue work-launching program 330 for launching sets of multiple threads to execute the data-consumption shader program 320 and/or the data-production shader program 310. In an example, FIFO queue work-launching program 330 can operate using a single thread to dispatch the multiple threads of the data-consumption shader program 320 and/or data-production shader program 310. In this regard, in one example, FIFO queue work-launching program 330 may be executed on the CPU 34. In addition, for example, the FIFO queue work-launching program 330 may include, or may be similar to, the dispatcher thread described herein. FIFO queue work-launching program 330 can include a FIFO queue write-done monitor 332 for monitoring the write done pointer 218 of one or more FIFO queues to determine when to launch a set of threads to consume the data written to the FIFO(s). For example, FIFO queue write-done monitor 332 can determine to start threads to read the data when the write done pointer 218 is detected to advance to a certain value (e.g., a value equal to or within a threshold of the number of threads in a set, a value equal to a number of items on a page of memory, etc.). FIFO queue work-launching program 330 can also include a FIFO queue multi-allocate-for-read routine 332 for determining/allocating the number of threads to launch to read data written to the FIFO queue (e.g., based on the write done pointer 218 value), executing the set of threads to read the data, etc., as described further herein. In an example, the FIFO queue multi-allocate-for-read routine 332 may update the Read Allocation Pointer 220 to indicate the number of items that may be consumed, and can pass a copy of the Read Allocation Pointer (or a derivative of it) to each instance of the data consumption shader program, to be used in the address generation routine 322, to determine which data to consume. In an example, the work launching program 330 can launch more than one consumer thread per data element or group of data elements to consume, or it can launch a group of threads per data element or group of data elements to consume, where the number of data elements may include a group, and the number of shader threads to launch, can be provided by application 46, or calculated by some other mechanism.

Figure 4:
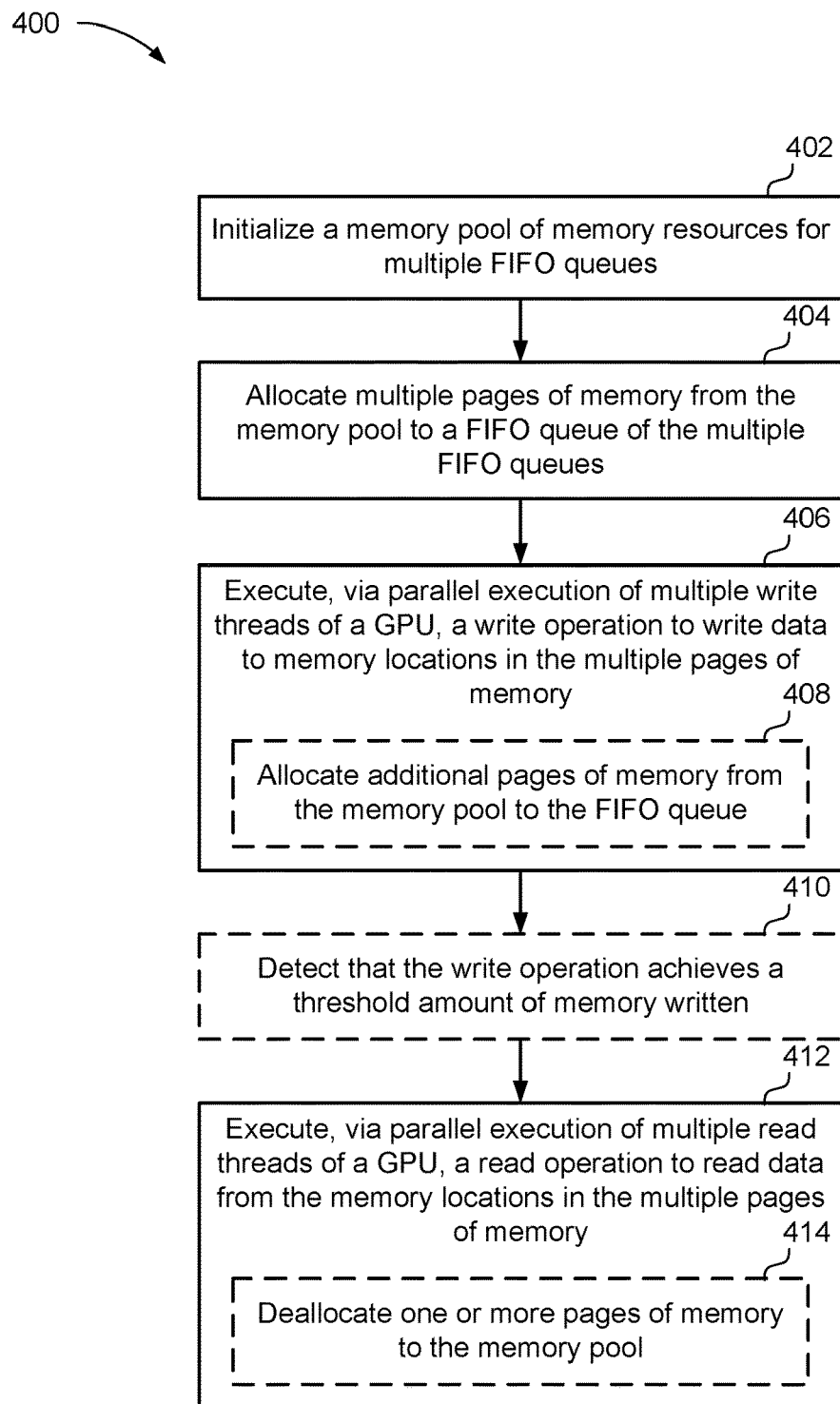
FIG. 4 is a flowchart of an example of a method of managing, writing, and reading growable memory resources according to the described examples.

In addition, prior to executing threads to perform the data-production shader program 310 and/or data consumption shader program 320, application 46 can initiate, or cause initiation of, one or more FIFO queue initialization routines 336 for establishing the one or more FIFO queues, allocating corresponding memory from memory pool 82, etc., as described above and further herein (e.g., in actions 402, 404 of method 400 in FIG. 4).

Referring to FIG. 4, one example of a method 400 for operating a GPU 12 to manage and utilize memory resources is illustrated.

At 402, method 400 includes initializing a memory pool of memory resources for multiple FIFO queues. In an example, GPU 12 or CPU 34 via FIFO queue manager 74, can be configured to initialize the memory pool of memory resources (e.g., in graphics memory 58) for multiple FIFO queues. For example, the GPU 12 can initialize the memory pool as a collection of virtual memory addresses, where the addresses can each relate to a unit of memory, such as a page. For example, a page can be 64 kilobytes (kB) or substantially any span of memory addresses. In addition, in this example, the GPU 12 can manage initialization or allocation/deallocation of the collection of memory addresses, though a portion of the addresses may correspond to physical memory that is actually allocated in the graphics memory 58, while another portion of the addresses may not correspond to allocated physical memory. In this example, the GPU 12 or CPU 34, via a thread managing the memory space, can automatically allocate the non-allocated virtual addresses to physical memory when a threshold is achieved. For example, the threshold can correspond to a threshold number of unused-but-physically-allocated pages (e.g., a number that is less than a threshold), where an unused-but-physically-allocated page can correspond to a page of memory that is allocated to the GPU 12 but does not have data (or has only stale or otherwise expired data) written to it. In an additional example, GPU 12, via a thread managing the memory space, can automatically free unused pool pages from the memory pool 82, if the list of unused-but-physically-allocated pages achieves a threshold indicating that the number of unused-but-physically-allocated pages has become too large (e.g., more than a different or the same threshold).

In any case, GPU 12 can have a memory pool with at least some memory resources for allocation to a FIFO queue, as described herein, and GPU 12 or CPU 34 can manage the pool to allocate/deallocate physical resources when the respective thresholds are achieved.

At 404, method 400 includes allocating multiple pages of memory from the memory pool to a FIFO queue of the multiple FIFO queues. In an example, GPU 12, via FIFO queue manager 74, FIFO queue initialization routine 336, etc., can be configured to allocate the multiple pages of memory from the memory pool to a FIFO queue of the multiple FIFO queues (e.g., FIFO 1 210, . . . , FIFO N 230). In one example, GPU 12 can perform the allocation based on initializing the FIFO queues before rendering an image. In addition, for example, GPU 12 can determine an initial allocation size based on one or more parameters configured for and/or provided to the GPU 12 (e.g., by CPU 34) or otherwise known to the GPU 12. For example, GPU 12, in ray tracing, may initialize FIFO queues for each texture or surface, and may allocate multiple pages (e.g., one or two pages to start) to each of the FIFO queues. This can help to avoid delay in allocating memory to the FIFO queue on a first instance of a write operation to the FIFO queue.

In addition to allocating memory to the FIFO queue(s), FIFO queue initialization routine 336 can perform additional initialization procedures, such as associating a function, program, shader object, pipeline state object, etc. with each FIFO queue, which can be invoked to consume data that has been added to the FIFO queue. For example, these can include data-production shader program 310, data-consumption shader program 320, etc. In addition, FIFO queue initialization routine 336 can associate a minimum batch size, maximum batch size, batch size granularity, preferred batch size, etc. of data to be consumed, to each FIFO queue. Each thread reading the data (e.g., via data-consumption shader program 320) can utilize the batch sizes when reading data from the FIFO queues. In another example, FIFO queue initialization routine 336 can associate a count of threads to be invoked to consume each batch of data acquired from the FIFO queue. In addition, in an example, FIFO queue initialization routine 336 can set one or more parameters for each FIFO queue, such as an associated priority for reading data from (and/or writing data to) the FIFO queue, whether the FIFO queue is growable or not, whether the FIFO queue can be automatically validated or not, etc. In addition, in one example, FIFO queue initialization routine 336 can add an initial amount of data to one or more FIFO queues to indicate that the FIFO queue is in use and avoid deallocation of the FIFO queue or associated memory.

At 406, method 400 includes executing, via parallel execution of multiple write threads of a GPU, a write operation to write data to memory locations in the multiple pages of memory. In an example, GPU 12 can be configured to execute, via parallel execution of multiple write threads of the GPU 12, the write operation to write data to memory locations in the multiple pages of memory. For example, GPU 12 can execute (e.g., via commands 36 sent by CPU 34, or via FIFO queue work-launching program 330) one or more compute shaders to perform the write operation to write data to the FIFO queue, as described herein. For example, the one or more compute shaders can execute a fixed set of threads, such as 64 threads executing in parallel, to perform one or more write operations. Each of the multiple threads can write some data into the FIFO queue, which may include each write thread performing a data-production shader program (e.g., data-production shader program 310 defined above) to produce data (e.g., via data-production routine 312), push the data to the FIFO queue (e.g., via FIFO queue push/enqueue routine 314), possibly allocate one or more additional memory pages to the FIFO queue (e.g., via pool page-allocation routine 316), and/or update a write done pointer (e.g., via FIFO queue write-done update routine 318), as described above.

For example, to facilitate the write operation, each FIFO queue may include pointers to its corresponding pages in the memory pool (e.g., page addresses 212), as well as a write allocation pointer (e.g., write allocation pointer 216) to track both which page in memory to write to, and the location within that page to write, and/or a write done pointer (e.g., write done pointer 218) to indicate a location where all previous data has been written in memory. As described further herein, the GPU 12 can accordingly determine a page to which to perform a write operation based on the pointer corresponding to the FIFO queue and/or the write allocation pointer 216. Thus, for example, the write allocation pointer can allow each thread to determine where to write its data, and each thread, upon determining the write allocation pointer, can advance the write allocation pointer to a next memory location for writing data. The acts of reading and advancing the write allocation pointer can be performed together atomically, e.g., by Atomic/Interlocked Operation Hardware 63, in order to avoid race conditions that would otherwise occur with multi-threaded programming.

In addition, once the data is written, the thread can advance the write done pointer. In one example, this can be performed based on an array of write done counters, based at least in part on determining that all write operations of the write threads have completed. For example, the array of write done counters can include one page write counter per page or segment of the FIFO queue. The counters can be zero initialized with the FIFO at the time of initialization, and can be incremented after writes are performed to a page, and then initialized back to zero when the write done pointer advances beyond the page. In an example, the write done pointer can be advanced using the conditions and calculations shown in 508, as explained in detail below.

Executing the write operation can also optionally include, at 408, allocating additional pages of memory from the memory pool to the FIFO queue. In an example, GPU 12, e.g., via a compute shader or other thread performing FIFO queue write operations, can be configured to allocate the additional pages of memory from the memory pool to the growable FIFO queue (e.g., by using functionality provided by the FIFO queue manager 74). In one example, the GPU 12 can allocate the additional pages of memory based on a location of the write allocation pointer. For example, where the write allocation pointer achieves a threshold, the GPU 12 can allocate an additional page (or pages of memory) out of the memory pool (e.g., memory pool 82), which can occur via the write thread that detects the write allocation pointer achieving the threshold. For example, this threshold for the write allocation pointer may correspond to a memory location located in a page in or before a last memory page in the list of page addresses 212. For example, the threshold may be a last memory position in the second to last memory page in the list of page addresses 212, a memory location at another position in the second to last page (or last page), etc., such that the memory can be allocated and assigned to the FIFO queue before other write threads attempt to allocate a memory position beyond the last page currently assigned to the FIFO, without those other threads having to wait for the allocation before writing to the additional memory resources.

At 410, method 400 can optionally include detecting that the write operation achieves a threshold amount of memory. For example, the GPU 12 can be configured to detect that the write operation achieves the threshold amount of memory. In one example, this can include GPU 12, or a write thread which is updating the write done pointer, or a dispatcher thread (e.g., a FIFO queue work-launching program 330) that manages the writing and/or reading operations, detecting that the write operation achieves the threshold amount of memory. This can be based on, for example, determining that the write done pointer for the FIFO achieves a threshold (e.g., as compared to the read allocation pointer or otherwise). In one example, threshold can be based on a priority indicated for the FIFO, such that higher priority FIFOs can have the threshold detected before lower priority FIFOs. For example, this threshold amount of memory can be set to ensure enough data is written to the FIFO to justify executing a read operation using multiple read threads of the GPU 12, as described in further detail below (e.g., such that no threads, or only a maximum portion of threads, are not used during the read operation).

In one example, the dispatcher thread can loop through the FIFO queues to determine whether to start reading from one or more of the FIFO queues (e.g., based on whether the write done pointer achieves the threshold). In another example, one or more of the write threads can notify the dispatcher thread that data is available for reading, which may be a notification sent from the write thread after it updates the write done pointer. In a specific example, the dispatcher thread can monitor, via one or more processors of the GPU 12 and/or CPU 34, the write done pointers associated with one or more FIFO queues, and in response to the presence of data that has been written but not consumed, the dispatcher thread can perform various operations. Such operations may include allocating some or all written data for consumption based on the parameters and conditions specified at FIFO queue initialization time. On the state of the write done pointer indicating how much data has been written to each FIFO queue, and based on the amount of data which has already been allocated for consumption (e.g., based on a read allocation pointer), the dispatcher thread can invoke execution of one or more threads of a shader program (e.g., a data-consumption shader program 320) to be executed in a parallel manner on GPU 12, as described below in action 412. In addition, the dispatcher thread may optionally provide information to the shader program such as an identifier for the FIFO queue that stores the data, the starting or base address of the data to be consumed, or an index from which the base address can be derived, in combination with the FIFO queue ID, the number of elements of data to be consumed, and/or the like.

In either case, at 412, method 400 can include executing, via parallel execution of multiple read threads of a GPU, a read operation to read data from the memory locations in the multiple pages of memory. For example, the GPU 12 can be configured to execute, via parallel execution of multiple read threads of the GPU 12, the read operation to read data from the memory locations in the multiple pages of memory. For example, GPU 12 can execute (e.g., via FIFO queue work-launching program 330) one or more compute shaders to perform the read operation to read data from the FIFO queue, as described herein. For example, the one or more compute shaders can execute a fixed set of threads, such as 64 threads executing in parallel, to perform the read operation. Each of the multiple threads can read some data from the FIFO queue. which may include each read thread performing a data-consumption shader program (e.g., data-consumption shader program 320 defined above) to pop data to be read from the FIFO queue (e.g., via FIFO queue pop/dequeue address-generation routine 322), consume the popped data (e.g., via data-consumption routine 324), and/or possibly free the data from the FIFO queue (e.g., via FIFO queue data-free routine 326) including deallocating one or more pages of data from the FIFO queue (e.g., via pool page-free routine 328), as described above.

For example, the GPU 12 can launch (e.g., via FIFO queue work-launching program 330) enough shaders to read the data written based on the write done pointer. For example, GPU 12 can determine the number of data elements to be consumed (e.g., as a number of bytes represented in a difference between the read allocation pointer and the write done pointer), and then can launch one or more read threads to consume each data element, and/or it can launch one or more threads (such as a wave, or threadgroup, or portion of such) that can cooperate to consume a batch of data elements (such as a part or whole portion of a page filled with data). The size of the batch of data to be consumed, and the number of threads to launch to consume each batch of data, can be specified by Application 46, or by some other mechanism. In another example, the dispatcher thread can launch threads to read the data until a read thread is unable to advance the read allocation pointer (e.g., once the read allocation pointer reaches the write done pointer).

For example, to facilitate this operation, each FIFO queue may include pointers to its corresponding pages in the memory pool (e.g., page addresses 212), as well as a read allocation pointer (e.g., read allocation pointer 220) to track where data has been assigned for reading in a given page of memory, and/or a read done pointer (e.g., read done pointer 222) to indicate a point before which all data has been fully read and consumed, and/or an array of counts of bytes or elements consumed on each page (e.g., Read Done Counters 226). As described further herein, the read allocation pointer can allow each thread to determine where to read its data, and each thread, upon determining the read allocation pointer, can advance the read allocation pointer to a next memory location for reading data (e.g., for use by another thread). The acts of reading and advancing the read allocation pointer can be performed together simultaneously (atomically), e.g., by Atomic/Interlocked Operation Hardware 63, in order to avoid race conditions that would otherwise happen with multi-threaded execution.

In addition, once the data is read, the thread may advance a read done pointer. In one example, this can be performed based on a read done tracker, which can include an array of counters 226 (e.g., one per page or per segment of the FIFO queue) indicating how many bytes or data items have been consumed from each page or segment of the FIFO queue. For example, the read done tracker's counters can be zero initialized with the FIFO at the time of initialization, and can be incremented as reads are performed for a page, and then initialized back to zero when the read allocation pointer advances beyond the page. When the read done counter reaches a threshold that indicates that all data allocated for reading on a page has been fully read (e.g., and thus that the page has been entirely filled with data), which can be determined by comparing the read counter with the read allocation pointer, this can indicate that the read done pointer may be updated (e.g., by a read thread or the thread dispatcher) based on the read done tracker. To determine the new read done pointer value, the thread may read the counters of the read done tracker, starting from the counter corresponding to the page associated with the previous value of the read done pointer, and ending with the first counter indicating that data on the corresponding page has not been fully written and/or consumed, and then updating the read done pointer to that location, similarly to the conditions and operations performed for updating the write done pointer which are shown in action 508 of method 500 in FIG. 5.

In one example, the invoked shader programs can perform operations such as retrieving data from a specified portion of the specified FIFO queue, where the specified portion can be indicated to the shader program by the dispatcher thread. The operations can also optionally include updating a counter indicating portions of the FIFO queue have been read (e.g., a read done counter 226), freeing newly unused portions of the FIFO queue to be reused, or freed to a pool, as described in further detail below, performing calculations or memory requests based on data retrieved from the FIFO queue, performing write operations to append data to one or more other FIFO queues, updating a pointer (e.g., a write allocation pointer and/or write done pointer) indicating data has been appended to the one or more other FIFO queues and is ready for consumption, etc. In another example, if data was written to one or more FIFO queues, the data-consumption shader program 330 that wrote the data can also notify the dispatcher thread or threads that data has been written to one or more specific FIFO queues.

Executing the read operation can also optionally include, at 412, deallocating one or more pages of memory to the memory pool. In an example, GPU 12, e.g., via a compute shader or other thread of execution managing the read threads, can be configured to deallocate the one or more pages of memory from the memory pool (e.g., by using functionality provided by the FIFO queue manager 74). In one example, the GPU 12 can deallocate the one or more pages of memory based on a location of the read done pointer. For example, where the read done pointer achieves a threshold, which may correspond to the end of a page, the GPU 12 can deallocate the page (and optionally some number of preceding pages in memory), back to the memory pool (e.g., memory pool 82, which can add the page or pages (e.g., pointers thereto) to free page list 204). For example, this can occur via the read thread that detects the read done pointer achieving the threshold. For example, the threshold for the read allocation pointer may be a memory location in a second page or other subsequent page in the list of page addresses 212, which can indicate that the first page or other prior pages, have been read. Freeing the memory back into the memory pool in this regard can allow for reuse of the memory for other FIFO queues such to conserve resources over previous memory management for executing graphics processes. In another example, the operation of freeing pages to the pool 82 can be based solely on the associated counter 226 in the read done tracker passing a threshold. For example, once all data on a page is consumed, the page may be freed to pool 82 immediately (or otherwise based on detecting that all data on the page is consumed), even if data in preceding pages of the FIFO queue has not yet been consumed or freed.

Figure 5:
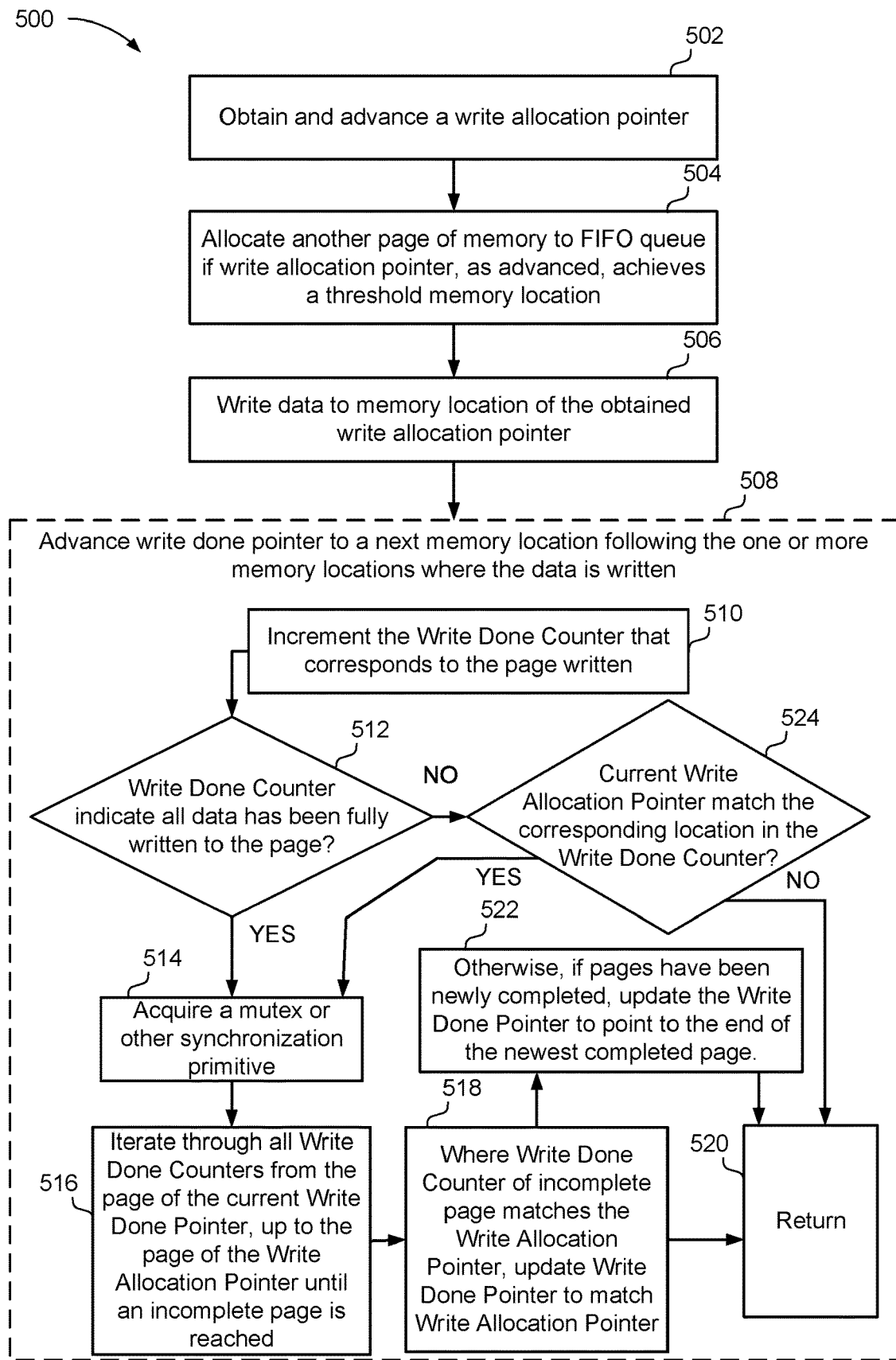
FIG. 5 is a flowchart of an example of a method of writing to growable memory resources according to the described examples.

Referring to FIG. 5, one example of a method 500 for operating a GPU 12 to write data to memory resources is illustrated. For example, method 500 can be performed by each write thread in a group of multiple write threads executing in parallel, as described herein. In one example, hardware-specific optimizations can be performed, such as coalescing requests to the Atomic/Interlocked Operation Hardware 63, arranging data structures to tune for device caching behavior/bus arrangement, etc. before performing operations described in method 500.

At 502, method 500 includes obtaining and advancing a write allocation pointer. In an example, GPU 12 can be configured to, e.g., via a compute shader or other construct executing a write thread, FIFO queue push/enqueue routine 314, etc., to obtain and advance a write allocation pointer. For example, the GPU 12 can initialize a group of threads to write data into the FIFO queues. Thus, the GPU 12 can provide the data for writing, and can initialize the group of threads via a FIFO queue work-launching program 330 or command processor 64 that can manage writing and reading of data to/from the queues. For example, the given write thread can obtain the current write allocation pointer 216 and can advance the write allocation pointer 216. This may include performing an atomic operation to both obtain and advance the write allocation pointer 216 (such as by an instruction or request to Atomic Operation Hardware 63). Thus, for example, once the operation to advance the write allocation pointer succeeds, the thread can determine the write allocation pointer to use in writing its data (e.g. as the write allocation pointer 216 value before the increment or advance procedure succeeded). Moreover, as described, the write allocation pointer 216 can track memory locations as a function of a memory unit size for the FIFO queue, and thus the write allocation pointer 216 can be incremented by 1 (e.g., 1 memory unit size) by a given write thread, and the address can be resolved by at least one of subdividing the write allocation pointer into portions representing the memory page index, and offset within the page, looking up the memory page's address based on the index, and adding the offset multiplied by the memory unit size, etc. Once the write allocation pointer 216 is advanced, a next write thread can determine its write allocation pointer address and advance, and so on. This is so because advancing the pointer is "atomic" operation, and many threads or groups of threads can have an outstanding "obtain and increment" request outstanding at a time. Thus, while the GPU 12 itself processes these requests in order, the threads may not need to wait for other threads directly. Thus, no spinning or locking may be required.

In addition, in an example, where a write thread advances the write allocation pointer 216 beyond a last allowable page (e.g., overflow), the write thread can perform an atomic subtract to set the write allocation pointer 216 to element zero of page zero. The other write threads that retrieve a write allocation pointer in the overflowed state (e.g., after the write allocation pointer overflows but before the write allocation pointer is fixed up by the atomic subtraction), can perform a local subtract of their retrieved write allocation pointer 216 to offset from element zero of page zero. For example, if 1024 pages are allowed, and each page allows 512 elements, then both the atomic subtract operation and the local subtractions may subtract by a value of 1024*512, or 524288. In another example, if it is desired to track how many times the write allocation pointer has wrapped, then after the write allocation pointer crosses a threshold that is a specified multiple N of the number of pages P times the number of elements E per page, then subtractions of N*P*E may be performed after the write allocation pointer crosses a threshold of N*P*E; and the number of times wrapping (modulo N) can be calculated by dividing the write allocation pointer by P*E.

In one example, the dispatcher thread can initiate an ordered write (or push to the FIFO queue) by both reading and advancing the write allocation pointer 216, and then indicating, to each write thread, the original value of the write allocation pointer 216 and a thread identifier. Thus, each write thread can deduce its write allocation pointer 216 for writing the data to the FIFO queue, as described above, as an offset from the indicated write allocation pointer based on the thread identifier.

At 504, the method 500 includes allocating another page of memory to the FIFO queue if the write allocation pointer, as advanced, achieves a threshold memory location. In an example, GPU 12 can be configured to, e.g., via a compute shader or other construct executing a write thread that can utilize the FIFO queue manager 74, pool page-allocation routine 316, etc., allocate another page of memory to the FIFO queue if the write allocation pointer 216, as advanced, achieves a threshold memory location. Thus, this operation can be performed by the write thread that detects the write allocation pointer 216 achieving the threshold to ensure the allocation occurs one time for the multiple write threads. In addition, the threshold can be set so allocation occurs before the memory is actually needed for writing, so threads do not have to wait for allocation before writing data (e.g., a memory location in a second to last page in the list of memory page addresses 212, a memory location within the last page that is before the end of the page, such as a center memory location, etc.).

At 506, the method 500 includes writing data to a memory location of the obtained write allocation pointer. In an example, GPU 12 can be configured to, e.g., via a compute shader or other construct executing a write thread, write data to the memory location calculated from the obtained write allocation pointer. For example, for a non-growable FIFO queue (such as a ring buffer), the address may be calculated by adding a base address to a product of the write allocation pointer (modulo the number of items allowed in the ring buffer), times the size in bytes of items written to the ring buffer. Or in another example, in a growable ring buffer, the address may be calculated by extracting a portion of the obtained write allocation pointer corresponding to a page index, and looking up a page address from that index, and adding that address to a remaining portion of the returned write allocation pointer.

For example, the data to write can be produced by a data-production routine 312, which may include data related to graphics processing (e.g., data or instructions related to rendering graphics, ray-tracing graphics, etc.). In this example, as each write thread has a separate value for the obtained write allocation pointer 216, as described, any of the write threads can write data to the FIFO queue in parallel at the addresses calculated from their unique values obtained from write allocation pointer 216.

At 508, the method 500 optionally includes advancing the write done pointer to a next memory location following the one or more memory locations where the data is written. In an example, GPU 12 can be configured to, e.g., via a compute shader or other construct executing a write thread, FIFO queue write-done update routine 318, etc., advance the write done pointer 218 to the next memory location following the one or more memory locations where the data is written. In another example, one or more of the write threads, or a dispatcher thread, can advance the write done pointer by the number of write threads once the threads have completed, or can advance by a write done counter 224 value. In yet another example, this may include the write thread (e.g., a detected last write thread or otherwise) notifying the dispatcher thread that data has been written to the FIFO queue. In another example, the write thread can also increment a write done counter 224, as described.

In a specific example, advancing the write done pointer at action 508 may include, at 510, incrementing the write done counter that corresponds to the page written. In an example, GPU 12 can be configured to, e.g., via a compute shader or other construct executing a write thread, FIFO queue write-done update routine 318, etc., increment the write done counter 224 that corresponds to the page written. In this example, at 512, it can be determined whether the write done counter indicates that all data has been fully written to the page. In an example, GPU 12 can be configured to, e.g., via a compute shader or other construct executing a write thread, FIFO queue write-done update routine 318, etc., whether the write done counter indicates all data has been fully written to the page. For example, this can include determining whether the write done counter is equal to a value representing a maximum number of items that can be written to the page.

Where the write done counter indicates that all data has been fully written to the page, at 514, a mutex or other synchronization primitive can be acquired. In an example, GPU 12 can be configured to, e.g., via a compute shader or other construct executing a write thread, FIFO queue write-done update routine 318, etc., acquire the mutex or other synchronization primitive such as a "No-Spin Mutex" 710. In an example, this can be accomplished using atomic/interlocked operation hardware 63, as described. In this example, at 516, all write done counters can be iterated through from the page of the current write done pointer, up to the page of the write allocation pointer until an incomplete page is reached. In an example, GPU 12 can be configured to, e.g., via a compute shader or other construct executing a write thread, FIFO queue write-done update routine 318, etc., iterate through all write done counters 224 from the page of the current write done pointer 218 up to the page of the write allocation pointer 216 until the incomplete page is reached. For example, this can include determining an incomplete page as having a write done counter not equal to the number of items that can be written to a page.

At 518, where the write done counter of the incomplete page matches the write allocation pointer, the write done pointer can be updated to match the write allocation pointer, and can return at 520. In an example, GPU 12 can be configured to, e.g., via a compute shader or other construct executing a write thread, FIFO queue write-done update routine 318, etc., can, where it determines that the write done counter 224 matches the write allocation pointer 216, update the write done pointer 218 to match the write allocation pointer 216.

At 522, where the write done counter of the incomplete page does not match the write allocation pointer (i.e., if one page has been newly completed, but another page has some space allocated for writes, which writes have not yet completed) the write done pointer can be updated to point to the end of the newest completed page, and the code can return at 520. In an example, GPU 12 can be configured to, e.g., via a compute shader or other construct executing a write thread, FIFO queue write-done update routine 318, etc., if the pages have been newly completed, update the write done pointer 218 to point to the end of the newest completed page of memory.

Where the write done counter does not indicate that all data has been fully written to the page at action 512, at 524, it can be determined whether the current write allocation pointer matches the corresponding location in the write done counter. In an example, GPU 12 can be configured to, e.g., via a compute shader or other construct executing a write thread, FIFO queue write-done update routine 318, etc., determine whether the current write allocation pointer 216 matches the corresponding location in the write done counter 224. If not, this can indicate that there is more writing to be performed, and the action 508 can return at 520. Or if so, action 508 can proceed to 514 to acquire the mutex and begin iterating through counters, as described.

Figure 6:
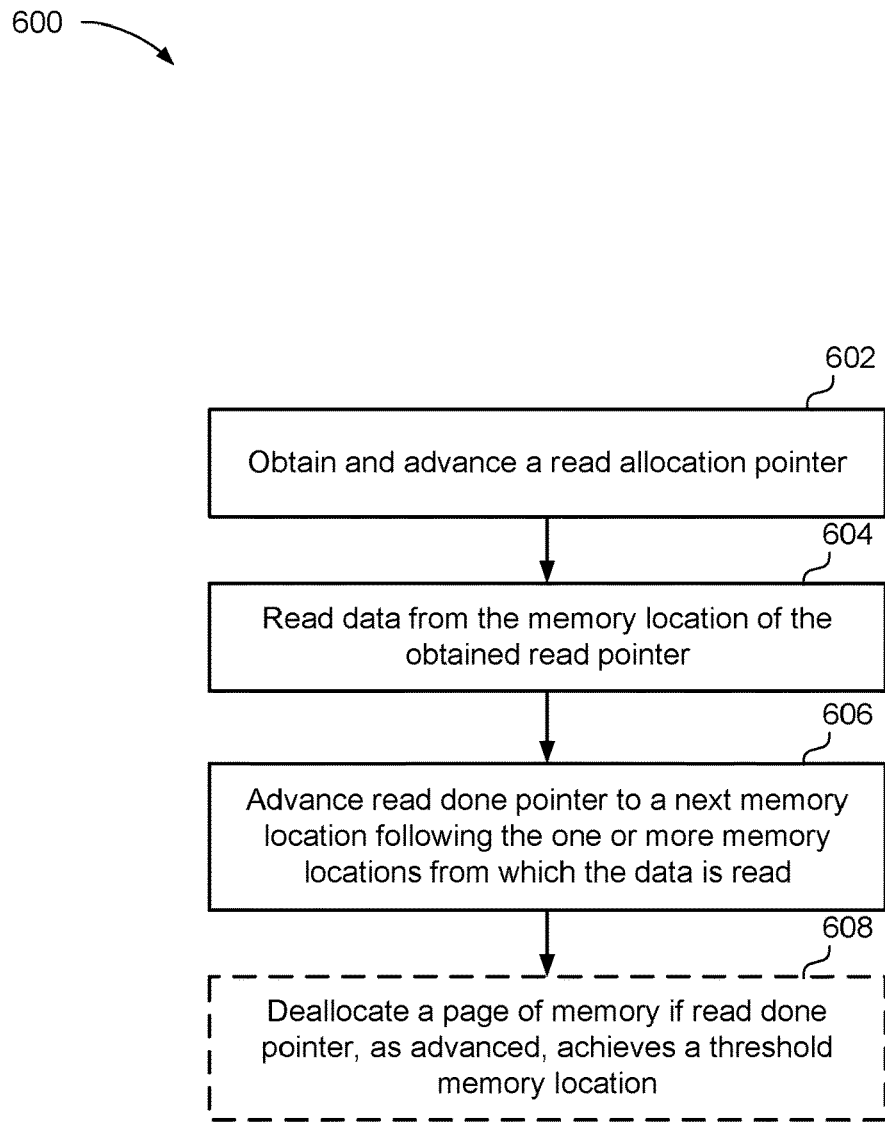
FIG. 6 is a flowchart of an example of a method of reading from growable memory resources according to the described examples

Referring to FIG. 6, one example of a method 600 for operating a GPU 12 to read data from memory resources is illustrated. For example, method 600 can be performed by each read thread in a group of multiple read threads executing in parallel, as described herein.

At 602, method 600 includes obtaining and advancing a read allocation pointer. In an example, GPU 12 can be configured to, e.g., via a compute shader or other construct executing a read thread, FIFO queue pop/dequeuer address-generation routine 322, etc., obtain and advance the read allocation pointer. For example, the GPU 12 can initialize a group of threads to read data from the FIFO queues. In one example, the GPU 12 can determine to execute the group of threads based on the write done pointer 218, as described (e.g., via a FIFO queue work-launching program 330 that can manage threads that perform the writing and reading of data to/from the queues). For example, the given read thread can obtain the current read allocation pointer 220 and can advance the read allocation pointer 220. This may include performing an atomic operation to both obtain and advance the read allocation pointer 220. Thus, for example, once the operation to advance the read allocation pointer succeeds, the thread can determine the read allocation pointer to use in reading its data (e.g. as the read allocation pointer 220 value before the increment or advance procedure succeeded). Moreover, as described, the read allocation pointer 220 can track memory locations as a function of a memory unit size for the FIFO queue, and thus the read allocation pointer 220 can be incremented by 1 by a given read thread, and the address can be resolved by subdividing the read allocation pointer into portions representing the memory page index, and offset within the page, looking up the memory page's address based on the index, and adding the offset multiplied by the memory unit size. Once the read allocation pointer 220 is advanced, a next read thread can determine its read allocation pointer address and advance, and so on.

In another example, at step 602, FIFO queue work-launching program 330 (or other dispatcher thread) can read a Write Done pointer (via 332) and perform a multi-element allocation 334 to obtain and update read allocation pointer 220, then launch a set of shader threads and pass the old copy of the read allocation pointer to the shaders.

In one example, modes of FIFO Queue processing can be provided for reading the data where reading of the data may occur simultaneously with writing of data from a different option of the same FIFO queue—or a mode may exist where reading and writing simultaneously is not allowed.

At 604, the method 600 includes reading data from the memory location of the obtained read allocation pointer. In an example, GPU 12 can be configured to, e.g., via a compute shader or other construct executing a read thread, data consumption routine 324, etc., read data from the memory location of the obtained read allocation pointer. Thus, as each read thread has a separate value for the obtained read allocation pointer 220, as described, any of the read threads can read data from the FIFO in parallel at their corresponding read allocation pointer 220 addresses. In another example, the read thread can also increment a read done counter 226, as described.

At 606, the method 600 includes advancing the read done pointer to a next memory location following the one or more memory locations from which the data is read. In an example, GPU 12 can be configured to, e.g., via a compute shader or other construct executing a read thread, FIFO queue data-free routine 326, etc., advance the read done pointer 222 to the next memory location following the one or more memory locations from which all data has been read by one or more read threads. In one example, a counter of completed reads per page is maintained (e.g., read done counters 226), such that any time a read thread completes a read, it increments the appropriate counter; when a thread determines that it has completed the last read on a page, it can update the read done pointer 222 to point to the beginning of the next page of memory, after verifying that data has also been read from any previous pages (e.g., by reading the read done pointer 222 and/or previous page read counters 226). In another example, when a thread determines that it has completed the last read that has been initiated, e.g., because the outstanding read counter on a page matches the number of reads which have been initiated on the page, and the read done pointer points to that page, the read done pointer can be updated to point to the read allocation pointer.

At 608, the method 600 optionally includes deallocating a page of memory if the read done pointer, as advanced, achieves a threshold memory location. In an example, GPU 12 can be configured to, (e.g., via a compute shader or other construct executing a read thread that can utilize the routines of the FIFO queue manager 74, such as pool page-free routine 328, etc.,) deallocate a page of memory if the read done pointer 222, as advanced, achieves a threshold memory location. Thus, this operation can be performed by the read thread that detects the read done pointer 222 achieving the threshold to ensure the deallocation occurs one time for the multiple read threads. In addition, the threshold can be set to ensure an entire page is read before it is freed back to the memory pool 82, to prevent data corruption in reading the page. In addition, this can include marking the page for deallocation (e.g., where another thread, such as a dispatcher thread, can actually process the deallocation).

In one example, the dispatcher thread can initiate an ordered read (or pop from the FIFO queue) by retrieving and advancing the read allocation pointer 220, and then indicating, to each read thread, the initial value of the read allocation pointer 220 along with a thread identifier. Thus, each read thread can deduce its read allocation pointer 220 for reading the data from the FIFO queue, as described herein, as an offset from the indicated read allocation pointer based on the thread identifier. In this example (when ordered reads are used), a dispatcher thread can advance the read done pointer by the number of threads once the threads have completed, or the consumer threads can perform the update of the read done pointer as previously described.

In one example, the dispatcher thread can initiate threads that perform both one or more ordered read operations and/or one or more ordered write operations, from one or more FIFO queues, by examining and advancing the associated read allocation pointers 220 and/or write allocation pointers 216, and passing the original values as inputs to the shader threads.

In another example, a number of items written per page can be tracked via write done counters 224 in the write threads, as can a number of items read per page via read done counters 226 in the read threads. These counters can be updated via atomic instructions. In this example, a dispatcher thread, or some other thread such as might be executing the consumption shader program 320, can compare the counter values to determine when the page has been fully written and read, and can use this information to determine when to deallocate the page. For example, when a thread updates a page's read done counter 226, it can compare it to a threshold indicating that all data in the page has been read (and therefore, by assumption, was also first written)—and therefore, the page can be freed by the thread, or be marked by the thread to be freed by some other thread at a later time.

Additionally, other modes of FIFO Queue processing can be provided (in addition to, or in combination with the above) where excessive read requests can be detected (e.g., where the read threads attempt to access beyond the write done pointer) and/or where excessive write requests can be detected (e.g., where the FIFO queue is full, but a thread attempts to push additional data into it). Additional modes can also be provided (in addition to, or in combination with the above modes) where FIFOs are growable or not growable. In this example, the application 46 or FIFO queue manager 74 or other software may select a mode or combination of modes for a FIFO queue or collection of FIFO queues, in order to determine behavior of shaders and other threads or programs which will initialize, manage and/or use the growable FIFOs.

Figure 7:
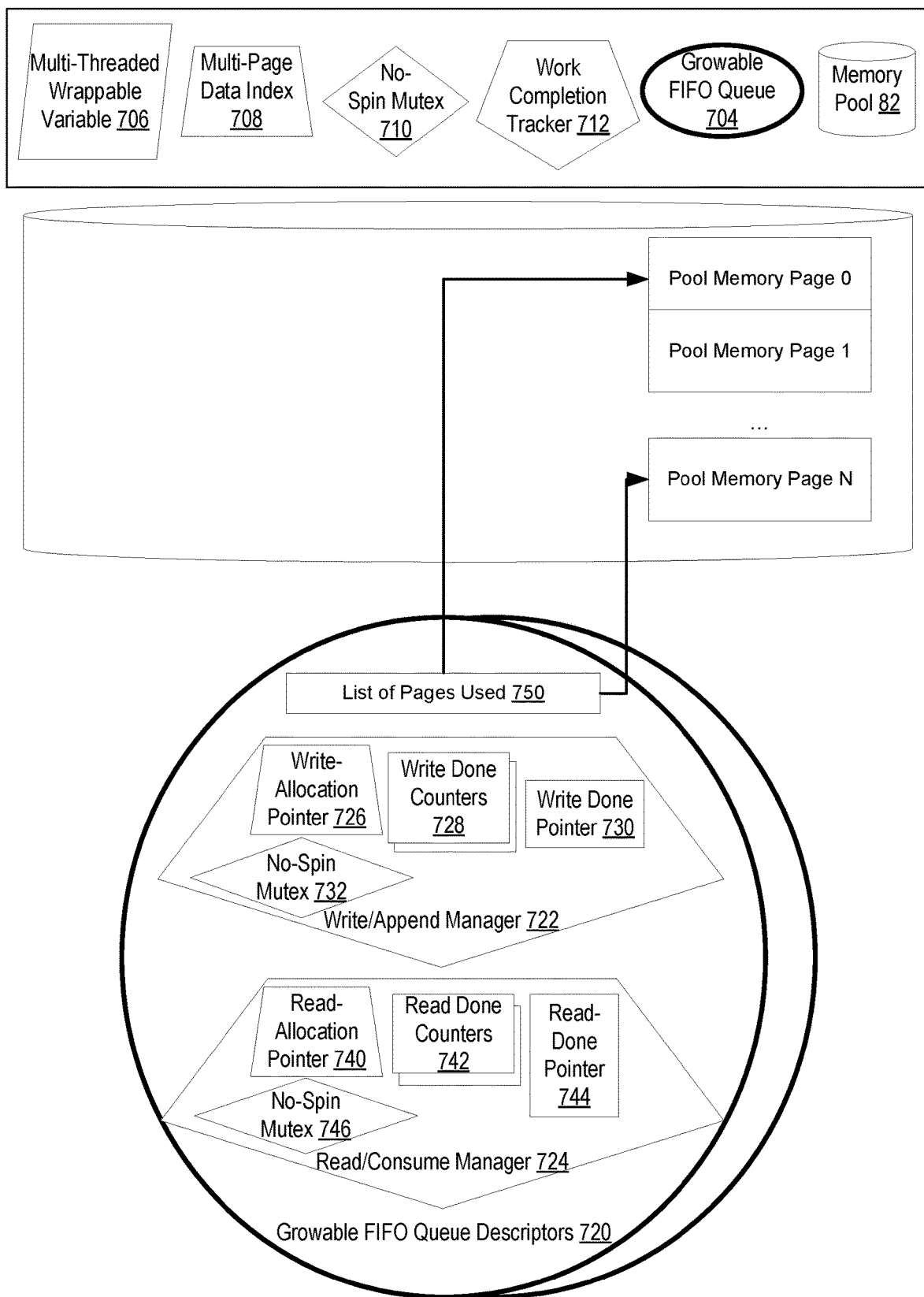
FIG. 7 is a schematic diagram of an example of a hierarchy of components used to build a growable first-in first-out (FIFO) queue.
Figure 8:
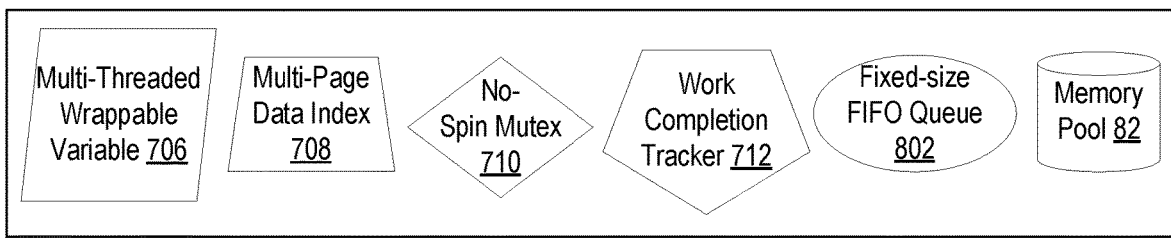
FIG. 8 is a schematic diagram of an example of a hierarchy of components used to build a fixed-size FIFO queue.
Figure 8:
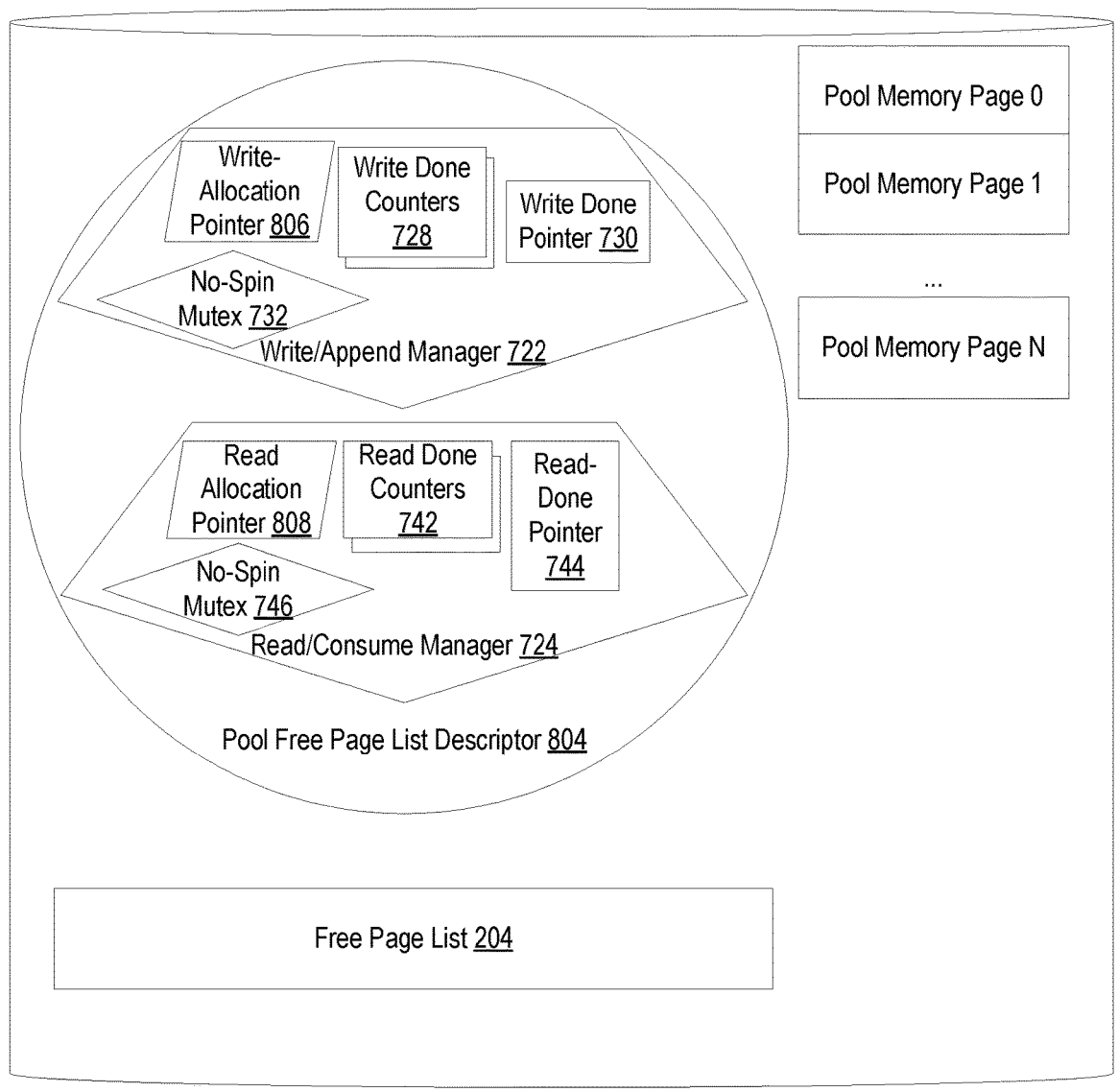

FIGS. 7 and 8 illustrate a hierarchy of objects/classes used to build a non-growable FIFO queue, a memory pool, and a set of growable FIFO queues backed by an associated memory pool, as described above. For example, various components can be provided by the application shader programs 73, FIFO queue manager 74, shader processor core(s) 68 and/or other hardware and/or software components of the GPU 12, CPU 34, etc. as building blocks for providing the growable FIFO queue 704 and/or related functionality described herein. Each growable FIFO queue 704 can include growable FIFO queue descriptor 720 describing a status, contents, etc. of, and/or to facilitate writing data to and/or reading memory from, each growable FIFO queue. In an example, the growable FIFO queue descriptors 720 may include a write/append manager 722 having a write allocations pointer 726, write done counters 728, write done pointer 730, no-spin mutex 732, etc., as described. In addition, in an example, the growable FIFO queue descriptors 720 may include a read/consume manager 724 having a read allocations pointer 740, read done counters 742, read done pointer 744, no-spin mutex 732, etc., as described. In addition, in an example, the growable FIFO queue descriptors 720 may contain a list of pages 750 used by (or assigned to) the growable FIFO queue, where each page referenced (by pointer, index, address, etc.) by the list 750 is associated with a memory pool 82 associated with the growable FIFO queue.

For example, a Multi-threaded, Wrappable Variable 706 can be provided. This can be a building block for the read allocation pointer 808 (also referred to herein as the "Read-Alloc Pointer") of a fixed-size FIFO queue 802 described in FIG. 8, and write allocation pointer 806 (also referred to herein as the "Write-Alloc pointer") for use by various read and write threads, as described above. The Multi-threaded, Wrappable Variable 706 can also be used as a building block of the Multi-Page Data Index 708, which is described below. The Multi-threaded, Wrappable Variable 706 can exist in memory, and many threads can increment it simultaneously, using atomic/interlocked operation hardware 63. The Multi-threaded, Wrappable Variable 706 can have a certain number of bits B (where B can be 32, but could be other values). There can be a "wrap point", or a "maximum valid value" M selected, such that $0<M$, and $2*M<=2^{\wedge}B$ (2 to the power of B). If a thread T (e.g., a read thread or a write thread) increments the wrappable variable (e.g., as part of advancing the corresponding read or write allocation pointer) such that it crosses from $<M$ to $>=M$, the thread T can be responsible for performing an atomic operation to subtract M from the variable. The code executed by all threads that read V (without incrementing it) may occasionally receive a value of V that is $>=M$, in which case those threads may subtract M from their obtained value, before using the results for various calculations. Additionally, the code executed by all threads that increment V may be designed in such that when some thread T causes V to cross the boundary from $<M$ to $>=M$, these other threads may not be allowed to increment V to a value $>=M*2$, before the first thread adjusts the value to a value $<M$. For instance, where B is 32, M may be 89473024 (5461*16384, as may be the case where a Growable FIFO is capable of storing 12-byte data elements into up to 16384 unique 65536-byte pages).

In addition, a Multi-Page Data Index 708 can be provided, which can be a building block for the Read-Alloc Pointer 740 and a Write-Alloc Pointer 726 of the growable FIFO queue 704. These pointers (which indicate both a page, and indices of memory locations in a page) can be incremented by multiple threads simultaneously, can be converted from a simple numeric representation (which can be easily modified by atomics), into a page index, and an offset within that page, etc. For this Growable FIFO implementation, the Multi-threaded Wrappable Variable 706 described above can be used. For example, M can be set to the maximum allowed valid value=NumberOfPages*NumberOfUniqueAllowedIndicesInAPage. For example, if "V" is the name of the index in memory, then: PageIndex=V/NumberOfUniqueAllowedIndicesInAPage, and IndexWithinThePage is =V % NumberOfUniqueAllowedIndicesInAPage. If M is a power of 2, then the division (/) and modulo (%) operations can simplify to binary math. If M is not a power of 2, then these operations (where division and modulo instructions may not be available on a GPU) can be simplified to simpler multiplication and shift operations, using commonly-known algorithms.

In another example, a No-Spin Mutex 710 can be provided. There may be situations where a given task is to be performed occasionally, and multiple threads may (e.g., based on their own calculations) determine that the task is to be performed. Especially in shader environments where there are thousands of active threads, it can be desirable to have a mechanism which allows threads to complete a given task, but that no thread waits (e.g., spins) while attempting to start the work. The GPU 12 can provide a No-Spin Mutex by using a single DWORD. The FIFO queue manager 74, application shader programs 73, such as data-production shader program 310, data-consumption shader program 320, etc., can implement or otherwise leverage operations for the No-Spin mutex 710, such as: "TryToAcquire" (which can return a value representing "acquired" or "some other thread owns"), and "TryToRelease" (which can return a value representing "released" or "try the task again"). TryToAcquire can perform an InterlockedIncrement of the control integer, and can return "acquired" if the previous value was 0, or "some other thread owns" if the previous value is >0. TryToRelease can perform an InterlockedExchange of the control integer, exchanging it with 0. If the previous number was equal to 1, then the release succeeded, and the task is completed. If the previous number was greater than 1, this can indicate that another thread requested that the task be re-tried while the current thread was performing the task. If this is the case, the thread can re-call TryToAcquire. If that fails, this can indicate another thread has acquired the mutex, and can complete the task, so the current thread is done. If the new call to TryToAcquire succeeds, then the thread can loop back to perform the task again, call TryToRelease again, and repeat. In an example, write/append manager 722 can include one or more no-spin mutexes 732 to provide such functionality for one or more of the pointers, (e.g., write done pointer 730), etc. Moreover, in an example, read/consume manager 724 can include one or more no-spin mutexes 746 to provide such functionality for updating one or more of the pointers, (e.g., read done pointer 744), etc.

In another example, a Simple Ordered-Start-Unordered-Completion Work Tracker can be provided (which is approximately used as a building block of the Nested Work Completion Tracker 712). This simple work completion tracker can contain a single work allocation counter (indicating how many work items have been initiated), a single work completion counter (indicating how many work items have been completed, though not in any particular order), a work done pointer (indicating how many consecutive work items, starting at the first, have been completed, and therefore can be used to determine how many consecutive results of the work item tasks can be consumed, or how many consecutive inputs to the work items can be discarded, etc.), and a no spin mutex which controls access to the work done pointer.

If there are a certain number of tasks to perform, FIFO queue manager 74, application shader programs 73, such as data-production shader program 310, data-consumption shader program 320, etc., can provide or utilize a simple Work Completion Tracker to assign work and track how many items have been completed.

When a thread, (such as one or more write threads executing in action 404 of method 400, one or more read threads executing in action 412 of method 400, etc.) allocates a work item (or multiple work items), the thread can perform an InterlockedAdd (or InterlockedIncrement) on the WorkStarted counter. When a thread completes a work item, it can perform an InterlockedAdd (or InterlockedIncrement) on the Work Completed counter. The thread can then determine whether it just completed the last initiated work item or not, as for which the thread can re-read the current value of the Work Started Counter and compare this value to the new value of the Work Completed Counter. If the thread determines that these values are the same, the thread can attempt to acquire the No-Spin Mutex, and either the thread or a different thread that already owned the mutex can then re-read the Work Started Counter and Work Completed Counter, and if the two values are equal, set the Work Done Pointer equal to the Work Completed Counter. For example, write/append manager 722 and/or read/consume manager 724 can be implemented at least partially as a Simple Work Completion Tracker. The concepts used to build the Simple Work Completion Tracker can be used to build a Nested Work Completion Tracker 712.

In another example, a Nested Work Completion Tracker 712 can be provided, which can facilitate separating a large batch of work into smaller batches (e.g., in executing multiple write threads in action 406 or multiple read threads in action 412 of method 400, and/or in corresponding methods 500, 600), where each batch can include more than one work item. This Tracker may use a Multi-Threaded Wrappable Variable 706, or Multi-Page Wrappable Data Pointer 708 to track allocated work, a per-batch count of how many work items have been completed, optionally a per-batch "Done" pointer, a global "done" pointer, and a mutex or other synchronization primitive such as a No-Spin Mutex (see above). In allocating new work items, a thread can (e.g., via FIFO queue manager 74, application shader programs 73, such as data-production shader program 310, data-consumption shader program 320, etc.) increment the Wrappable Data Pointer (and performing the associated wrapping). The thread that allocates a work item can be responsible for determining which batch the work belongs to (or which "page", see the Multi-Page Data Pointer described herein). Once a work item is complete, the thread can be responsible for incrementing the appropriate per-batch Work Completed Counter, then performing similar operations as with the Ordered-Start-Unordered-Complete tracker. After acquiring the global mutex: the thread can be update the per-batch "done" counter, the thread can also check whether the "global done pointer" indicates all work on the page that that global pointer is pointing to or not. If so, the thread can scan through all batches after that, until it finds a batch that is not completely done, and can update the global done pointer to point to the appropriate point in that batch. One thread can do this work, so no other threads have to spin waiting on it. In one example, write/append manager 722 and/or read/consume manager 724 can be implemented at least partially as a Nested Work Completion Tracker.

In another example, referring to FIG. 8, a Fixed-Size FIFO queue 802, also referred to as a Basic Ring Buffer Implementation, can be provided by the FIFO queue manager 74, application shader programs 73, such as data-production shader program 310, data-consumption shader program 320, etc. Implementing a Ring Buffer in a highly-multithreaded environment, such as shaders on a GPU, can be accomplished using examples described herein. Fixed-Size FIFO queue 802 includes a descriptor as described herein, and can also have an associated data buffer (such as might be described by a base address and a size). In an example, the data buffer might be used to store a list of addresses (such as pool free page list descriptor 804, which can indicate free memory pages in the free page list 204) or other graphics-related or non-graphics-related data. To work with the described features, the Fixed-Size FIFO queue 802 can be split into segments (or batches or pages) of substantially equal size. As similarly described with respect to the growable FIFO queue 704 above, in an example, one or more of the following can be used to provide the Fixed-Size FIFO queue 802: a Multi-Page Data Index 708 or Multi-threaded Wrappable Variable 706 for allocating space for writes, a Nested Work Completion Tracker 712 for writes (e.g., write/append manager 722), a Multi-threaded Wrappable Variable 706 for allocating already-written data for reads, a Nested Work Completion Tracker 708 for reads (e.g., a read/consume manager 724), and one or more associated memory buffer(s) (which may or may not be located in the memory pool 82) of a specified size to hold the data, etc. Note that all data written to a specific non-growable FIFO queue's associated buffer can be of the same fixed size, though other FIFO queues may be used to contain data elements of a different size. Or if a non-growable FIFO queue contains multiple associated buffers, each buffer can have its own fixed unique or non-unique element size. In one example, where Multi-threaded Wrappable Variables 706 are used to provide the pointers, such as Write-Alloc pointer 806 and Read-Alloc Pointer 808, there can be a conversion step to convert between the Multi-threaded Wrappable Variable Pointers, and the actual address in the Fixed-Size FIFO queue 802 by scaling the multi-page data pointer based on the fixed size of the data to read/write, and offsetting the result by a base address associated with a buffer associated with the fixed-size FIFO queue.

There can be multiple steps to use a Fixed-Size FIFO queue 802, as described above. To write data, for example, a thread writing the data (e.g., the multiple write threads executing in action 406 of method 400 and/or in method 500) can, via application shader programs 73, such as data-production shader program 310, data-consumption shader program 320, etc., increment the Write-Alloc Pointer 806, and retrieve the previous value of it, convert the pre-incremented Write-Alloc Pointer 806 to an address to write the data, taking note of which "batch" of data is being written, write the data, and wait for its data to be guaranteed to be fully written and visible to other threads, increment the Nested Work Completion Tracker's appropriate per-batch done counter (e.g., one or more write done counters 728), and take appropriate steps based on that (e.g., updating the Write Done Pointer 730 using steps described above). To read data, for example, a thread reading the data (e.g., the multiple read threads executing in action 412 of method 400 and/or in method 600) can, (via FIFO queue manager 74, application shader programs 73, such as data-production shader program 310, data-consumption shader program 320, etc.), follow similar steps as used for writing data, except use the Read-Alloc Pointer 808, and the read-time work completion tracker (e.g., one or more read done counters 742), instead of the "write" variants. In an example, however, code can be designed to prevent the Fixed-Size FIFO queue 802 from entirely filling up, to prevent the write pointer from wrapping around and entering the same batch as the read pointer. For example, if the Fixed-Size FIFO queue 802 of 1 megabyte (MB) is divided into 16 batches of 64 kilobytes (KB) each, the program (such as FIFO queue manager 74, application shader programs 73, data-production shader program 310, data-consumption shader program 320, etc.), can guarantee there is at least 64 KB of space between the read and write pointers. Also, in some examples, the program (such as FIFO queue manager 74, application shader programs 73, data-production shader program 310, data-consumption shader program 320, etc.), can prevent requesting (or reading) of data that has not been fully written, and (for example) return an error code.

In another example, a Basic Pool Implementation for Shaders can be provided by the FIFO queue manager 74 or some other library of GPU-executable code. A Pool can refer to a memory allocation subdivided into equally-sized chunks, which can be allocated, used, and then later freed (e.g., returned to the pool), such as memory pool 82, as described above. Using building blocks described above, a Pool for highly multithreaded environments like shaders can be implemented, such as FIFO queue manager 74 implementing, providing and utilizing memory pool 82. An example pool implementation can include: a memory allocation (e.g., such as initializing the memory at action 402 of method 400), which is subdivided into equal-sized chunks, a Fixed-Size FIFO queue 802 (which holds or manages Free Page list 204), whose associated data buffer is large enough to hold a reference or pointer to each chunk of the pool, plus some extra padding specific to the Fixed-Size FIFO queue 802 rules discussed earlier. Various operations can be performed on the memory pool 82 such as initializing the pool (e.g., at action 402 of method 400), allocating pages from the memory pool (e.g., at actions 404 or 408 of method 400), and freeing pages back to the pool (e.g., action 414 of method 400), etc.

In an example, initializing the free page list of the pool may be performed by "pushing" one entry into the Fixed-Size FIFO queue 802 per chunk of the pool, which entry may include a pointer or index to that chunk of the pool.

In an example, allocating from the pool can be done by "popping" one entry from the Fixed-Size FIFO queue 802. The data "popped" can include an index or pointer to the chunk or page of the pool which can be used.

In another example, once a thread is done using the chunk of the pool it allocated, it can "free" by "pushing" the address or index of the pool chunk into the Fixed-Size FIFO queue 802. The pool's associated Fixed-Size FIFO queue 802 can be referred to as the Free Page List, or the Free Chunk list. In some implementations, one or more pages of the pool can be pre-allocated to hold the free-page list itself.

In another example, as described, a Growable FIFO queue 704 can be provided, as described herein. A standard Fixed-Size FIFO queue 802 implementation, or fixed-size FIFO queue 802 (described earlier) is of fixed size. A Growable FIFO queue 704 can be similar in implementation to the Fixed-Size FIFO queue 802 mentioned earlier, except that the buffer for holding the Growable FIFO queue's data may not be a fixed size. For example, the Growable FIFO queue 704 can start at an initial size, and then automatically can grow to fit the data that is "pushed" or enqueued into it, and/or can shrink as data is "popped" or dequeued out of it. A Growable FIFO queue 704 can be associated with a memory pool 82 (as described earlier), whose "chunks" or "pages" can be a reasonably large size (such as 64 KB). These chunks can be allocated by the Growable FIFO queue implementation, via a FIFO queue manager 74, application shader programs 73, such as data-production shader program 310, data-consumption shader program 320, etc., in order to expand the FIFO queue size. In an example, when the FIFO queue data is consumed, empty pages can be returned to the pool. The Growable FIFO queue 704 can also include a similar tracking structure as was described for the Fixed-Size FIFO queue 802 (namely, the Write-Alloc Pointer 726, the Read-Alloc Pointer 740, the nested write-completion tracker (e.g., write done counters 728), and the nested read-completion tracker (e.g., read done counters 742)), but it additionally can contain a list of pages 750 that are used in the Growable FIFO queue. The list of pages 750 can be large enough to hold some maximum number of pages, such as the number of pages in the associated pool, if the FIFO queue grows to that maximum size. This page list can be the same size, or smaller or larger than the number of segments tracked in the Write Done Counters 728 and/or Read Done Counters 742.

With Growable FIFO queues, the pages used to store the data may not be contiguous, as is the case with a Fixed-Size FIFO queue 802. In this example, the process of converting from a Multi-Page Data Index into a data address, can be different than is done for a fixed-size FIFO queue. The address can be calculated using a formula similar to the following: Address=PageAddressList[PageIndex]+ OffsetInPage*DataElementSize (where PageIndex and OffsetInPage are calculated using the formulas listed in Multi-Page Data Index). Note, the Growable FIFO queue 704 can be subdivided into pages, for growing/shrinking purposes. It also can be subdivided into segments (as with the Fixed-Size FIFO queue 802 implementation), for "work completion" tracking. The segments can be the same size as pages, or they can be larger or smaller. Smaller segments, for example, can allow the "done" pointer to be updated more frequently, though there may be additional processing associated with updating the "done" pointer.

Implementing the Growable FIFO queue 704 can include pre-allocating new pages before they are needed, as described above. A threshold of memory utilization can be established, such that the thread which allocates data beyond that threshold, can allocate a new page in the memory pool 82, and add the page's address into the page list. The threshold can be set to balance a desire that other threads do not spin waiting for the page allocation to be completed, with conserving memory space. In one example, when the Growable FIFO queue 704 is initialized, an appropriate number of pages can be pre-allocated. If (for example) the pre-allocation threshold is set at a distance D pages ahead, where 1<D<=2, then 2 pages can be pre-allocated, for example.

In another example, an optimization can be available to Growable FIFO queue 704 in that pages can be freed out of order. With a Fixed-Size FIFO queue 802, there may be a per-segment read done counter, and there can be the global read done pointer, which is updated whenever the oldest per-segment read done pointer is updated. But with growable FIFO queues, in some cases, the global read done pointer may not be used. For example, if growable FIFO queue is initialized such that it has a maximum size of P bytes (e.g., P=1 GB), any page allocated for writes may be freed before P additional bytes are allocated for writing by that FIFO. Removing the global read done pointer can allow a popping operation to become more efficient. In this situation, a page is freed when its associated read done counter reaches a threshold indicating that all data on the page has been fully consumed (and therefore that the page was first fully filled with data).

In another example, Error handling on Underflow can be provided. For example, when using Fixed-Size FIFO queue 802 or Growable FIFO queue 704, underflow may occur where a thread requests more data than has been completely pushed. To handle such conditions, for example, a shader executing the multiple write threads (e.g., at action 406 of method 400 and/or method 500, using a data-production shader program 310, etc.) or read threads (e.g., at action 412 of method 400 and/or method 600, using a data-consumption shader program 320, etc.) can fire an interrupt, or send a message to a CPU 34 or other processor by some other mechanism, to notify it that the memory pool 82 may be corrupted. In another example, a shader can assume that the threads pushing the data are active but delayed, which can result in the thread which is popping (or reading) the data to spin waiting for the push (or write) to be complete, before attempting to access the data at the returned address. In another example, FIFO queue manager 74, application shader programs 73, such as data-production shader program 310, data-consumption shader program 320, etc., can allow a mode where the FIFO is either in "append" mode or "consume" mode, but not both simultaneously. In this example, if a "pop" command is received, to pop (or read) data which is not present, the thread can just patch the Read-Alloc Pointer to set it equal to the Write Done Pointer. In another example, a shader program can implement an error handler where the retrieved Read-Alloc Pointer value (and potentially other data such as a FIFO ID) is pushed into a dedicated error-logging Fixed-Size FIFO queue 802 (or the error log can be a growable FIFO queue). Another thread can go back and read that error logging FIFO queue and process the missed data once it is present, in an example.

In another example, an Array of Growable FIFO queues 704 can be provided by the FIFO queue manager 74, application shader programs 73, such as data-production shader program 310, data-consumption shader program 320, etc. Having multiple Growable FIFO queue 704 that share a memory pool 82 can be useful, because queue sizes can be determined on the fly, based on the data that the shaders encounter. The memory pool 82, for example, can be sized to fit the largest amount of data expected (plus some padding, due to the Growable FIFO queue pre-allocation functionality), and the FIFO queues can resize themselves within the memory pool. The implementation of a Growable FIFO queue array can be similar to many instances of a single Growable FIFO queue, and there can be some optimizations provided by the FIFO queue manager 74 (e.g., in allocating pages of memory to the multiple FIFO queues in action 404 of method 400) to make it efficient on a GPU 12. Because the 32 or 64 (or other number of) threads in a shader can typically execute the same instructions simultaneously, the GPU 12 hardware typically implements optimizations for when the threads read and write data in close proximity to other threads. In order to optimize for the situation where different threads all want to push data, but to different FIFO queues, components of the FIFO descriptors can be stored as arrays (e.g., a struct of arrays), rather than having an array of FIFO descriptors (e.g., an array of structs). For instance if there are 128 FIFO queues, the 128 Write-Alloc Pointers 726 (or Write-Alloc Pointers 806 for fixed-size FIFO queue 802) can be kept in a 512-byte array, followed by the 128 Read-Alloc Pointers 740 (or Read-Alloc Pointers 808 for fixed-size FIFO queue 802) in another 512-byte array, followed by the No-spin Mutexes 732, 746 in another array, and the Done pointers 730, 744 in another array. In an example, the array of FIFO queues may include both Growable and Non-Growable types. In this example, the two can be distinguished, and the appropriate style of "push" and "pop" code to execute can be selected to respectively write and read data to the FIFO queues.

In another example, the FIFO queue manager 74 or other collections of shader code, hardware, software, or firmware, can provide mechanisms for reporting status to other portions of the GPU 12 and/or CPU 34. For example, the FIFO queue manager 74 can provide a New Work Summarizer. For example, it may be desirable for a shader to alert another component or program of the GPU 12 and/or CPU 34 (such as the FIFO queue write-done monitor of Work Launching Program 330, or the command processor 64, or the application 46) when new data is appended to a FIFO queue (whether growable or not). In this example, a bit array can be allocated for this purpose, with one bit per FIFO queue in the array. When the write done pointer 730 is updated for FIFO #F, the shader can atomically set the corresponding bit #F in the array, indicating that new work is available in that FIFO queue. When other component(s) or program(s) of the GPU 12 and/or CPU 34 (such as a write-done monitor 332) acknowledge that the new work has been observed and/or processed, the other component(s) can clear (or request clearing of) the corresponding bit (e.g., and/or can check for new work one additional time, after it clears the bit, to avoid a race condition). In many cases, summarizing the presence of new work in a bit array can be desirable over just having the external code scan through the array of Write Done Pointers, because the bit array for a large collection of FIFOs (such as 128) can typically be read and scanned in a few instructions, where scanning an array of Write Done Pointers may require hundreds of instructions and memory requests.

In another example, a New Work Prioritizer can be provided. In some situations, it can be desirable to prioritize new incoming work. For instance, on GPUs, it can be more efficient to launch shaders that have 64 active threads, instead of launching 64 shaders that each have one thread. Thus, when searching through FIFO queues to determine which FIFO queue to launch shaders to consume data from, it may be desirable to try to prioritize FIFO queues that can launch work in larger batches, in one example, but other consideration for prioritization may be possible as well, such as parsing data in depth-first order, etc. It can be beneficial to have an extra level of sorting and prioritization between the New Work Summarizer and the Auto-Dispatcher (described below) or Work Launching Program 330. A thread, either in a shader, or on the CPU, or on some other processor on the GPU, or a piece of dedicated hardware, etc., can periodically (or due to a message or interrupt from the shaders) perform an ordered scan the Write Done Pointers 730 that have been updated (possibly according to the first level of New Work Summarizer booleans), and categorize the new work based on various criteria (index of the FIFO queue, amount of work pushed-but-not-popped, etc.). The work can then be prioritized into buckets, with one bit per FIFO queue per bucket. A highest-priority bucket can have an N-bit array, indicating which FIFO queues have data that are high-priority. A next-highest priority bucket can have an N-bit array, indicating which FIFO queues have data in that bucket, etc. A thread that prioritizes work, therefore can check for new work from the New Work Summarizer bits, read the Write Done Pointer 730, and see how much new work is available on this FIFO queue; set the appropriate bit in the appropriate priority bucket, and potentially clear the corresponding bit in other priority buckets, clear the appropriate New Work Summarizer bit, check the Write Done Pointer 730 again (to avoid race condition), and repeat the past few steps if it changed.

In another example, a Basic Auto-Dispatcher can be provided (e.g., a dispatcher thread, such as Work Launching Program 330 as described above, which may be executing on CPU 34, GPU 12, etc.). When data is pushed into various FIFO queues, it may be desired to have a mechanism to know how much data was written, and be able to launch shader threads to consume the data. For example, the FIFO queue work-launching program 330 can wait for all data to be written to a FIFO queue, then check how much data was written via the Write Done Pointer, then launch a sufficient threads to read the data. In another example, the Auto-Dispatcher (e.g., FIFO queue work-launching program 330) can manage a variable per FIFO queue to track how much data any consumer (or read) threads are launched are intended to consume (such as Read Allocation Pointer 216 or a copy of it). In this example, the Auto-Dispatcher can periodically check if Write Done Pointer 730 has been updated (or use the output of the New Work Prioritizer, or use the results of the New Work Summarizer directly). Based on prioritization algorithms (which may include tracking the fullness of various FIFO queues, a priority based on FIFO ID, or based on the high few bits of the FIFO ID, some other factors, or a combination of the above), the Auto-Dispatcher can select a FIFO queue to be consumed from, select a Shader to be launched, determine the number of threads or thread groups to be launched, launch the Shader and corresponding threads/thread groups, update the data to be consumed variable. (and perform wrapping, if necessary, according to the Arbitrarily-wrappable Index rules), and update the New Work Prioritizer or Summarizer state, if necessary.

In an example, the Auto-Dispatcher can be single-threaded, although it could be multi-threaded in order to hide latency of fetching the Write Done Pointers and other states. Dedicated hardware could be added to simplify or optimize some of the prioritization. In an example, Auto-Dispatcher can select a FIFO queue by using InterlockedCompareExchange operations. In an example, the Auto-Dispatcher can sit in an infinite loop, always checking for work; or Terminate once all shaders it has launched have terminated, and all relevant FIFO queues are drained. The basic Auto-Dispatcher can include some logic to dictate prioritization, access to Write Done Pointers 730, and optionally a New Work Prioritizer and/or New Work Summarizer, a selection of which FIFO queues to monitor (typically either all FIFOs in an array, or a range of FIFO queues), and/or an array of Shaders or which Pipeline State Objects to use when launching work, per FIFO queue. The shaders launched by the basic Auto-Dispatcher may expect it to pass in the FIFO ID to fetch from, as an input to the shader (since it is conceivable that a given shader might be used to digest work from more than one FIFO queue).

In another example, an Ordered Push and Pop can be provided. For example, if the Basic Auto-dispatcher launches 1024 threads (e.g., executing a data-consumption shader program 320) to consume data from a FIFO queue, there may be no guarantee that the first of those threads will see the first piece of data, nor that the last thread will get the last piece of data. Indeed, if the Auto-Dispatcher immediately launches another 128 threads to consume more data, it is possible that some of those 128 threads could get data that is located earlier in the FIFO queue than some of the data retrieved by some of the 1024 threads (e.g., due to the push or pop algorithm, and/or due to the timing disturbances that can occur in a massively parallel environment).

There can be are some shader programming algorithms that require strict access to the data, or where the algorithm becomes more efficient if that strict access can be provided. For these situations, the Auto-Dispatcher can be modified, such that the Auto-Dispatcher performs the first step of "begin push", e.g., it performs the Atomic Add on the Read-Alloc Pointer 740. The Auto-Dispatcher can then pass the original Read-Alloc Pointer value as an input to the shaders, along with a ThreadID (and FIFO ID), and the shaders, or related write threads (e.g., executing at action 406 of method 400 or method 500) or read threads (e.g., executing at action 412 of method 400 or method 600) can accordingly generate their ordered index based at least in part on the provided Thread ID (e.g., Read-Alloc Pointer+ Thread ID, or some variation). Depending on the implementation, it may be desirable to have either the Auto-Dispatcher, or the Launched Thread, perform the atomic "wrap" operation to the Read-Alloc Pointer 740. In an example, all (or multiple) shader threads can perform local wrap operations, in case the dispatcher wraps beyond the end of the last allowed page/segment index of the FIFO queue. The shader threads can also perform Page Pre-allocation, and page address lookup, as described. Moving the initial Read-Alloc Pointer operation into the AutoDispatcher also may have a performance benefit, because having one thread perform a single "add" on behalf of multiple threads may be more efficient than having multiple shader threads each perform a single "increment by 1" operation. This same style of Ordered operation can also be applied to Pushes as well, as described above. For instance, if a shader consumes data from FIFO queue A, then produces additional data to be pushed into FIFO queue B, both operations can be ordered. The Auto-Dispatcher gives the Read-Alloc Pointer 740 and Write-Alloc Pointer 726 as an input to the shader.

In another example, Multiplication and Division of Work can be provided. An advanced Auto-Dispatcher, supporting Ordered Push/Pop, can also be made to support multiplication and division of work. Per FIFO queue, for example, the Auto-Dispatcher can determine how many threads (T) should be used to consume a certain number (N) of items out of the FIFO queue. To handle N items, the Auto-Dispatcher can wait for at least N items to be available, then launch (a/N)*T threads (e.g., write threads at action 406 in method 400 or method 500 and/or read threads at action 412 in method 400 or method 600) to process that data, where "a" is the largest multiple of N less than or equal to the number of items actually available. The method of dispatching T threads can be specified by: .x and .y size components are used to specify the number of threads (where .x*.y=T), and .z specifies the maximum number of groups of N items to handle in a single thread group.

In another example, Page and Partial Dispatches can be provided by the Auto-Dispatcher. In some examples (e.g., involving Sorting), it can be desirable for a thread group or thread groups to process all pushed elements on a given page, or a portion of a page. The Auto-Dispatcher can be made aware of this (e.g., by a "use pages" flag, per FIFO queue). The Auto-Dispatcher can launch N threads or thread groups per page to perform the sort. In some situations, only a partial page of data may be available, but it may be desirable to still launch shaders to perform the sort. In this example, the shaders can be designed to expect an extra input from the Auto-Dispatcher, (e.g., besides just the initial Read-Alloc Pointer), in the form of a post-added Read-Alloc Pointer. This can help to define the range of a number of items that the shader thread groups can sort or digest. Thread groups can determine whether they are part of the page of the Initial Read-Alloc Pointer, or whether they are in the page including the end Read-Alloc Pointer, or whether they are in a page which contains both, or neither.

In another example, Multi-Push, Multi-Pop, and Task Graphs can be provided. For example: shader A reads from FIFO 0, and writes data to both FIFO 1 and FIFO 2, Shader B reads from FIFO 1, and writes to FIFO 3, Shader C reads from both FIFO 2 and FIFO 3, combines their data, and outputs to some non-FIFO buffer. Shader C may expect that the first element it reads from FIFO 2 to correspond to the first element it reads in FIFO 3. In other words, for data fork/join behavior like this, strict ordering may be expected. For situations like this, the Auto-Dispatcher can be modified such that, instead of treating the list of FIFOs as to-do lists (e.g., meaning, "grab an element from this FIFO, and launch a shader thread to read it"), the Auto-Dispatcher can first receive a list of tasks. In the above example, the tasks may be: "for every 1 element to read from FIFO 0, allocate 1 element in FIFO 1, and 16 elements in FIFO 2, and launch N threads of shader A to do that work," "for every 1 element to read from FIFO 1, allocate 1 element in FIFO 2, and launch one shader B thread to do that work," "for every 1 element in FIFO 2, and 16 elements in FIFO 3, launch one thread group of Shader C to do that work." The Auto-Dispatcher can launch Shader C when at least one element was present in FIFO 2, and at least 16 elements were present in FIFO 2. Depending on the desired behavior of the task graph, the Auto-Dispatcher can use a variety of Ordered Push/Pop (for cases where data needs to converge), or unordered (especially for cases where a shader can add an unknown amount of data to a variety of FIFOs). The Work Prioritizer can be updated to handle prioritizing a task graph node (with its plurality of inputs and/or outputs), instead of a queue, for example.

In another example, Single-Write-Multi-Read, and Page Freeing can be provided. For example, there may be some situations where a single piece of data is written, but then multiple shaders may attempt to read the data before it is freed. In this example, it may be more efficient to leave the data in place, and only free it once all involved shaders have read it, rather than making multiple copies of the data for each shader reading the data to free. In this regard, the Auto-Dispatcher, in executing multiple read threads (e.g., at action 334 launching program 320) can track one separate "Work Launched" pointer per consumer (e.g., per thread of the multiple executed threads that desires to read the data). Each task graph node can include not only directions or related parameters for how much data to read from each FIFO, but also a memory location for the Auto-Dispatcher to write its current Work Launched pointer, per FIFO queue, that it reads. Similar functionality can be provided for multi-push situations. In addition, the data can be freed once all threads are done reading it. For example, if the two readers of the data are strictly ordered (e.g., the data is written by Shader A, then read by Shader B, and then, after Shader B is done, Shader C reads it also, meaning that Shader C does not read a portion of data before Shader B does), then Shader B can skip the "end_pop" code where the Read Done Pointer is moved, and Shader C can perform that work. If Shader B and Shader C can both consume a piece of data in arbitrary order, then it can be more desirable to implement an "AddRef"/"Release"-style mechanism. That is, for every element Shader A writes, it increments a counter (e.g., stored per page) by 2 (e.g., as there are 2 consumers). Additionally, Shader A increments the count by an extra 1 when it first arrives on the page, and decrements it by 1 when it writes the final element on the page, ensuring that the page is not freed while it is still being written. Shaders B and C each decrement the counter by 1 when they consume the data. Or, Shader B and Shader C can skip any per-page reference counting, and the Auto-Dispatcher can queue a work item to be completed when all of Shader B and Shader C's threads are completed, which work item instructs the Auto-Dispatcher to free the pages (or otherwise launch a shader to free the pages). This can be done by remembering the Read-Alloc Pointer that is to be reached by the time Shader B and C are done, along with the Read-Alloc Pointer that they started with. The cleanup shader (or the Auto- Dispatcher itself) can then free any fully-consumed pages between the two Read-Alloc Pointers.

In another example, the FIFO queue manager 74 can virtualize the memory pool 82 in initializing the memory pool and/or allocating pages from the memory pool, as described in conjunction with actions 402, 404 of method 400. There may be some situations where the amount of pool space required for Growable FIFO queue-related work (or any other work requiring the allocation of pool pages) can increase or decrease over time. In some situations, the memory pool 82 may be nearly entirely in use, and in other situations, the memory in pool 82 may be nearly free, but other unrelated programs or pieces of the pool-using program may wish to use the space in graphics memory 58 that the memory pool 82 is consuming. In some examples, the memory pool 82 can include a large (>=1 GB) allocation. But it may be possible to virtualize the pool, such that it uses a larger (>4 GB) virtual address allocation, but reserves the number of physical pages that it actually needs (plus some buffering, for efficiency).

In this example, the maximum number of pages used over a period of time can be tracked. This can be an "interlocked max" operation, with an interlockedExchange to reset the value. The memory pool 82 can include an additional Fixed-Size FIFO queue 802, listing pages which are not currently physically backed by actual physical memory, which can mean that the GPU's page tables map a given virtual address page as "invalid." A separate component (e.g., executing on a CPU 34, or possibly the same processor running the Auto-Dispatcher) monitors the memory pool 82. When the memory pool 82 achieves a threshold, the component can request additional physical pages to be mapped into the pool. This can be accomplished by popping an address off of the "Unmapped Pages" Fixed-Size FIFO queue 802, allocating physical memory for the page, and patching the page table to properly back the page with physical memory. The page is then added to the "Unused Pages" Fixed-Size FIFO queue 804 (e.g., instead of the Unmapped list 802). If the memory pool 82 is consistently using significantly fewer pages than are allocated to it, then it can offload some of its pages. This can be done by popping one or more page addresses off of the "unused" buffer, invalidating their page table entry, and adding the address to the "unmapped" Fixed-Size FIFO queue 802.

In another example, Automatic Pool Validation can be provided by the FIFO queue manager 74 on CPU and/or GPU, and/or by a Graphics API 52 or GPU driver 48, etc. Some features that use multithreading or pool management may be easily corrupted in implementation, and corrupting something like the unused page list of the memory pool 82 may result in dramatic corruption in many places. Likewise if the push/pop logic that writes to and reads from the memory pool 82 is not implemented or called properly, pages may be lost, double-freed, etc., which may cause undesirable behavior. Thus, in an example, the Auto-Dispatcher can be put in a mode to automatically validate the various growable FIFO queue descriptors 720, Pool Free Page List Descriptor 804 and data 204, and other Tracking Data. This validation can be performed by halting the GPU after a certain shader is done, (or after every use of a certain FIFO queue, or randomly, or every N Dispatches, etc.), then running a shader or CPU code which validates the buffers and tracking structures, etc. To track individual FIFO queues 802, 804, and 720, shaders can check to ensure that the Read-Alloc Pointer 740/808, Write-Alloc Pointers 726/806, Read Done Pointers 744, and Write Done Pointers 730 are all valid—when there are no shaders running which are actively pushing or popping data, these can all have a value between 0 and the maximum allowed value. Also, the Done Pointers should match the Alloc Pointers.

Any pages listed in the Growable FIFO queue's page list 750 which are between the Write Done Pointer 730 and the Read Done Pointer 744, should be valid (otherwise corruption has occurred). Any pages which are not in the valid portion of the lists of pages used 750, may be invalid, and may appear in the free page list 204 (or if a physically-unbacked list 802 is present, they could appear in that list), otherwise corruption has occurred. To track pool corruption, a boolean array can be allocated, with one bit per pool page. Iterating through the pool's "unallocated" list, through the "unused" list, and through each Growable FIFO queue, every time a given pool page is used, the boolean can be set to true using an interlocked operation. If the bit was already set when an operation says to set it, this can indicate that two things reference the same page, and corruption has occurred. Or, alternatively, if any page's bits are still zero when the scan is complete, this can indicate that a page has been lost, and corruption has occurred. The results of the validation can be written to a struct, and sent to a program 46 or queue manager 74, or driver 48 or API 52 that can report the problem to the user or developer (e.g., via Interrupt, via debug spew, telemetry sent to a server in the Internet, or by some other mechanism).

In another example, Out-of-Order Free on a Growable FIFO queue can be provided. An example use case for Growable FIFO queues can involve data being allocated and written in order, and consumed in order. There may be other use cases where the Growable FIFO queue is allocated and written in order, but the data is consumed out of order. For instance, if references or indexes to the contents of the FIFO queue are stored elsewhere, shader threads (e.g., multiple read threads executing in action 412 of method 400 and/or method 600) can derefence those pointers to consume data out of order. In these situations, instead of using alloc_pop (e.g., where the Read-Alloc Pointer is moved after reading data e.g. action 602) and end_pop (e.g., where the Read Done Pointer is moved after reading data, e.g. action 606), the alloc_pop may be unnecessary (because pointers to the data are already known); the data can accordingly be freed using an Add-Ref/Release model (e.g., alloc_push Add-Ref's a reference count, and "end_pop" increments a count of data consumed). When both counts are equal to the size of the page, the Auto-Dispatcher (e.g., FIFO queue work-launching program 330) or a thread executing a data-consumption shader program 320 (or other mechanism) can free the page, even if it is out of order. In this regard, a nested completion tracker (e.g., Write-Done Counters 728) may be used for pushing data, and/or a simple ordered-start-unordered-completion tracker (e.g., the simple tracker upon which Work Completion Tracker 712 is derived) may be used when consuming the data, because the consumption of the data may not require pages to be kept in any sort of order. An alternative approach may be to use a true Add-Ref/Release model, where a single "reference count" is incremented on production, and decremented on consumption. The page is freed once the reference count reaches zero, and some other condition is reached that indicates that all data to be written to the page has been written.

In yet another example, Indirect Auto-Dispatch can be provided. There may be situations where a shader or other source, fills a Growable FIFO queue or Fixed-Size FIFO queue 802 with counts of threads to be launched. The Auto-Dispatcher can be modified to check for work in this Fixed-Size FIFO queue 802, and perform the "pop" of this data, in order to launch work that it references. In a normal Auto-Dispatch, the Auto-Dispatcher determines how many entries are in a Growable FIFO queue or Fixed-Size FIFO queue 802, and launches threads to consume that data. But in this indirect approach, the Auto-Dispatcher fetches the contents of the Growable FIFO queue or Fixed-Size FIFO queue 802, in order to launch future work. For the act of launching the indirect work, for example, the indirect buffer can be permanently associated with one shader or Pipeline State Object (PSO) that can be responsible for consuming the data (e.g., by executing multiple read treads in action 412 of method 400 and/or method 600), or the indirect ring/FIFO can contain both a "count" and a pointer to a PSO or Shader (or the contents of the PSO, directly) associated with each count in the ring. Additionally, the count of threads to launch can include either one dimension (such as X or Z), or it could contain some combination of counts of two or three of the dimensions (X/Y/Z).

There also may be an optimization opportunity, which relates to how the Growable FIFO Implementation includes the Nested Work Completion Tracker. For example, if a combination of software and hardware can guarantee that there cannot be a span of more than N elements within the FIFO queue, of which shader threads have started a Begin push without completing an end push, then the memory required for the Nested Work Completion Tracker can be reduced to track completion of a small number (Q) of segments, where Q=ceiling((N−1)/NumElementsPerSegment)+2. By shrinking the number of work-completed counters, it may allow greater likelihood that in-use counters share cachelines, which can improve performance. A similar improvement can be done to the Basic Pop implementation.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various examples are described herein in connection with a device (e.g., computer device 10), which can be a wired device or a wireless device. Such devices may include, but are not limited to, a gaming device or console, a laptop computer, a tablet computer, a personal digital assistant, a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various examples or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some examples, the processor and the storage medium may reside in an ASIC. Additionally, the ASIC may reside in a computer device (such as, but not limited to, a game console). In the alternative, the processor and the storage medium may reside as discrete components in a user terminal. Additionally, in some examples, the steps and/or actions of a method or algorithm may reside as one or any combination or set of codes and/or instructions on a machine readable medium and/or computer readable medium, which may be incorporated into a computer program product.

In one or more examples, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While examples of the present disclosure have been described in connection with examples thereof, it will be understood by those skilled in the art that variations and modifications of the examples described above may be made without departing from the scope hereof. Other examples will be apparent to those skilled in the art from a consideration of the specification or from a practice in accordance with examples disclosed herein.

What is claimed is:

1. A method for managing first-in first-out (FIFO) queues in graphics processing, comprising:
    executing, via parallel execution of multiple write threads of a graphics processing unit (GPU), a write operation to write data to one or more write memory locations in multiple pages of memory from a memory pool allocated to a FIFO queue of the multiple FIFO queues, wherein, for a given write thread of the multiple write threads, the write operation comprises:
    based on writing the data to the one or more write memory locations by using a write allocation pointer that is common to the FIFO queue, advancing a write done pointer to a next write memory location following the one or more write memory locations to which the data is written;
    monitoring write done pointers associated with each of the multiple FIFO queues, including the write done pointer associated with the FIFO queue; and
    in response to determining, based on monitoring the write done pointers and based on read allocation pointers, that written data is present in the FIFO queue but has not been consumed by, or scheduled for consumption by, one or more read threads:
        comparing the write done pointers and the read allocation pointers to determine an amount of written data available for consumption from each of the multiple FIFO queues, based at least on:
            selecting, based on one or more of criteria related to the multiple FIFO queues, the FIFO queue or a set of FIFO queues including the FIFO queue from which to consume the written data;
            determining one or more base addresses of the written data to be processed based at least on one or more of the read allocation pointers associated with the FIFO queue or the set of FIFO queues;
        executing, via parallel execution of multiple read threads of the GPU, a read operation to read the written data from one or more read memory locations in the multiple pages of memory associated with the FIFO queue or the set of FIFO queues, wherein the one or more read memory locations are determined based at least in part on the one or more base addresses; and
        updating the one or more of the read allocation pointers, based on a range specified to one or more of the multiple read threads.

2. The method of claim 1, wherein the write operation further comprises:
    advancing the write allocation pointer to a next available write memory location following the one or more write memory locations to which the data is to be written;
    detecting whether the write allocation pointer achieves a threshold write memory location; and
    where the write allocation pointer achieves the threshold write memory location, allocating at least one additional page of memory from the memory pool to the FIFO queue.

3. The method of claim 1, wherein advancing the write done pointer is performed by the given write thread or a thread dispatcher.

4. The method of claim 1, wherein the read operation further comprises advancing, based on reading the written data from the one or more read memory locations, a read done pointer to a next read memory location following the one or more read memory locations from which the written data is read.

5. The method of claim 4, wherein advancing the read done pointer is performed by the given read thread or a thread dispatcher.

6. The method of claim 4, wherein the read operation further comprises:
    detecting whether the read done pointer achieves a threshold read memory location; and
    where the read done pointer achieves the threshold read memory location, marking at least one page of the multiple pages of memory for deallocation to the memory pool.

7. The method of claim 6, wherein the threshold read memory location corresponds to a last memory location on the at least one page of memory or a certain memory location in a next page of memory, wherein the next page of memory is after the at least one page of the multiple pages of memory.

8. The method of claim 1, wherein the read operation further comprises:
    incrementing, based on reading the written data, a read done counter of a number of items read from the one or more read memory locations on at least one page of the multiple pages of memory; and
    where the read done counter achieves a threshold count indicating that the at least one page has been both entirely filled with the written data and then entirely consumed, at least one of:
    marking the page for deallocation to the memory pool; or
    parsing read done counters associated with the multiple pages allocated to the FIFO queue in an order from oldest to newest, and marking all pages for deallocation to the memory pool until a page of memory in the multiple pages is reached whose written data has not been fully consumed.

9. The method of claim 1, wherein the read operation comprises an ordered read operation to read the written data from the one or more read memory locations in the multiple pages of memory, wherein the ordered read operation comprises:
  obtaining a read allocation pointer of the one or more read allocations pointers that is common to the FIFO queue;
  determining a read thread identifier;
  determining a read memory location of the one or more read memory locations based at least in part on the read allocation pointer and the read thread identifier; and
  reading memory at the read memory location.

10. The method of claim 9, wherein a dispatcher thread invokes execution of multiple ordered read threads that perform the ordered read operation and provides each of the multiple ordered read threads with the read allocation pointer and respective read thread identifiers, and wherein the dispatcher thread advances the read allocation pointer to a next read memory location following a last read memory location to be read by the multiple ordered read threads.

11. The method of claim 9, wherein a dispatcher thread executes multiple ordered read threads that perform the ordered read operation and further executes, via parallel execution of multiple ordered write threads of the GPU, an ordered write operation to write the data to ordered memory locations in the multiple pages of memory, wherein, for a given ordered write thread of the multiple ordered write threads, the ordered write operation comprises:
  obtaining the write allocation pointer that is common to the FIFO queue;
  determining a write thread identifier;
  determining a write memory location based at least in part on the write allocation pointer and the write thread identifier; and
  writing the data to the write memory location.

12. The method of claim 11, wherein the dispatcher thread executes the multiple ordered write threads and provides each of the multiple ordered write threads with the write allocation pointer and respective write thread identifiers, and wherein the dispatcher thread advances the write allocation pointer to a next memory location following a last write memory location written to by the multiple ordered write threads.

13. The method of claim 1, wherein initializing the memory pool of memory resources for the multiple FIFO queues comprises initializing a virtual address space that is larger than a physical address space allocated for the memory pool, and wherein a dispatcher thread manages allocation of the physical address space based on an amount of memory initialized in the virtual address space.

14. The method of claim 1, wherein the write operation further comprises incrementing, based on writing the data, a write page tracker of a number of items written to the memory locations on the at least one page of the multiple pages of memory;
  based on comparing the write page tracker with the write allocation pointer, initiating an ordered scan of the write trackers associated with a subset of the multiple pages of memory that are not marked as done, and
  based on the ordered scan, updating a write done pointer to indicate data in preceding memory locations has been written.

15. The method of claim 14, wherein initiating the ordered scan is based on determining when the write page tracker and write allocation pointer indicate that all memory locations allocated for writing on the at least one page have been written.

16. The method of claim 1, wherein the one or more of criteria related to the multiple FIFO queues include priorities associated with each of the multiple FIFO queues, the amount of written data available, thresholds associated with each of the multiple FIFO queues, FIFO queue identifiers, or a balanced selection method of the FIFO queues.

17. The method of claim 2, wherein the threshold write memory location corresponds to a certain memory location in a page of memory, wherein the page of memory is not a last page of memory in the multiple pages of memory allocated to the FIFO queue.

18. The method of claim 2, wherein the threshold write memory location is set based at least in part on a priority associated with the FIFO queue.

19. The method of claim 1, further comprising initializing a memory pool of the memory resources for the multiple FIFO queues;
  allocating the multiple pages of memory from the memory pool to the FIFO queue of the multiple FIFO queues.

20. A device for managing first-in first-out (FIFO) queues in graphics processing, comprising
  a memory storing one or more parameters or instructions for managing FIFO queues in graphics processing; and
  at least one processor coupled to the memory, wherein the at least one processor is configured to:
    initialize a memory pool of memory resources in the memory for multiple FIFO queues;
    allocate multiple pages of the memory pool to a FIFO queue of the multiple FIFO queues; and
    execute, via parallel execution of multiple write threads of a graphics processing unit (GPU), a write operation to write data to memory locations in the multiple pages of memory, wherein, for a given write thread of the multiple write threads, the write operation comprises:
      advancing a write allocation pointer to a next available memory location following one or more memory locations to which the data is to be written, wherein the write allocation pointer is common to the FIFO queue;
      detecting whether the write allocation pointer achieves a threshold write memory location; and
      where the write allocation pointer achieves the threshold write memory location, allocating at least one additional page of memory from the memory pool to the FIFO queue.

21. The device of claim 20, wherein the threshold write memory location corresponds to a certain memory location in a page of memory, wherein the page of memory is not a last page of memory in the multiple pages of memory allocated to the FIFO queue.

22. A method for managing first-in first-out (FIFO) queues in graphics processing, comprising:
  monitoring, via one or more processors of a graphics processing unit (GPU) or a central processing unit (CPU), write done pointers associated with each of one or more FIFO queues, and in response to determining, based on the write done pointers and read allocation pointers associated with the one or more FIFO queues, that data is present in a FIFO queue but has not been consumed by, or scheduled for consumption by, one or more read threads:
    determining an amount of the data that is available for consumption from each of the one or more FIFO queues, based at least on comparing the write done pointers and read allocation pointers, and/or on specified batch sizes;

selecting, based on one or more of: specified priorities of each of the one or more FIFO queues, counts of data available for consumption in each of the one or more FIFO queues, specified thresholds associated with each of the one or more FIFO queues, FIFO queue identifiers, and/or a balanced selection method, the FIFO queue or a set of FIFO queues from which to consume data;

determining one or more base addresses of data to be processed based at least on a read allocation pointer associated with the FIFO queue or the read allocation pointers associated with the set of FIFO queues;

invoking execution of one or more threads of a data consumption shader program to be executed in parallel on the GPU, wherein the data consumption shader program is configured to retrieve the data from the FIFO queue or the set of FIFO queues; and updating the read allocation pointer or the read allocation pointers, based on the range specified to the one or more shader threads.

23. The method of claim 22, wherein the data consumption shader program is additionally configured to perform calculations or memory requests based on data retrieved from the FIFO queue.

24. The method of claim 22, wherein the data consumption shader program is additionally configured to:

perform write operations to append the data to one or more other FIFO queues;

update a second write done pointer of the one or more other FIFO queues to indicate that data has been appended to the one or more other FIFO queues; and notify a dispatcher thread that the data has been written to the one or more other FIFO queues.

25. The method of claim 22, wherein invoking execution of the one or more threads of the data consumption shader program comprises providing, to each of the one or more threads, at least one of an identifier for the FIFO queue, a starting or base address of the data, an index from which the base address can be derived, an identifier unique to each thread or group of threads, and/or a number of elements of data to be consumed.

26. The method of claim 22, wherein the data consumption shader program is additionally configured to at least one of update a read done counter indicating portions of the FIFO queue that have been read, or free the portions of the FIFO queue that have been read for reuse or to the memory pool.

* * * * *